United States Patent
Terada

[19]

[11] Patent Number: 5,854,952
[45] Date of Patent: Dec. 29, 1998

[54] CAMERA

[75] Inventor: Hiroshi Terada, Mitaka, Japan

[73] Assignee: Olympus Optical Co., Ltd., Tokyo, Japan

[21] Appl. No.: 835,256

[22] Filed: Apr. 8, 1997

[30] Foreign Application Priority Data

Apr. 18, 1996 [JP] Japan ................................. 8-097202

[51] Int. Cl.$^6$ ................................................ G03B 17/24
[52] U.S. Cl. ........................................... 396/413; 396/418
[58] Field of Search ................................. 396/411, 413, 396/418

[56] References Cited

U.S. PATENT DOCUMENTS 5,456,419   10/1995   Ezawa ...................................... 396/418
5,512,970   4/1996    Kamoda et al. ........................ 396/418

Primary Examiner—David M. Gray
Attorney, Agent, or Firm—Louis Weinstein

[57] ABSTRACT

A camera capable of accomplishing with certainty a switching operation between a winding drive system and a rewinding drive system and of contributing to its size reduction. The winding drive system employs a film loading motor 48 and a clutch mechanism in the drive system to establish and cut off engagement of the drive system in accordance with rotating directions of a the film loading motor (48). Further, a differential reduction section is placed within a revolution area of a planetary gear of the clutch mechanism. The clutch mechanism is composed of first and second planetary clutch mechanisms, the first planetary clutch mechanism releasing the transfer of a driving force of the film loading motor within the winding drive system by the rotation of the motor in a first direction and the second planetary clutch mechanism releasing the transfer of a driving force of the motor within the rewinding drive system by the rotation of the motor in a second direction. Also provided in the camera is a reduction mechanism which performs differential reduction of a planetary gear of the first planetary clutch mechanism during revolution of the planetary gear.

18 Claims, 16 Drawing Sheets

[BACKLASH OF GEAR TRAIN : 0.07]

[BACKLASH OF GEAR TRAIN : 0.13]

[BACKLASH OF GEAR TRAIN : 0.07]

CAMERA

BACKGROUND OF THE INVENTION

1. Field of the Invention

The present invention relates to a camera, and more particularly to a camera equipped with a winding drive system and a rewinding drive system which transfer power from a single motor.

2. Related Background Art

So far, for a camera or the like using a 135 type film cartridge, there have been proposed and practiced various film loading mechanisms in which, for example, a power of a single motor is selectively coupled to a winding drive system and a rewinding drive system to execute the control of film loading (or feeding) operation through the use of the single motor.

In addition, there have been proposed and practiced various auto-loading mechanisms or the like where a friction mechanism composed of, for example, a rubber member, a roller and others is provided in the vicinity of a film take-up spool shaft so that the tip portion of a roll film (for example, a roll film or the like rolled and housed in the interior of a 135 type film cartridge or the like) set in the vicinity of the spool shaft is wound around the spool shaft of the camera through only the rotational operation of the spool shaft.

On the other hand, a structure recently proposed involves rolling and encasing the whole roll film including its tip portion in a cartridge. In this cartridge, a film forwarding mechanism or the like provided therein forwards the roll film in the cartridge to the exterior of the cartridge.

Further, a structure proposed involves that, for example, a magnetic recording area or the like is formed on a surface of a film accommodated within the aforesaid cartridge to magnetically permit the recording of photography information or the like. Moreover, a system based upon a camera or the like using this cartridge has been known as the so-called Advanced Photo System.

Even a camera or the like for this Advanced Photo System can accept the above-mentioned prior single-motor based film loading mechanism, auto-loading mechanism or the like.

Furthermore, in a camera or the like matching with The Advanced Photo System, it is convenient that, in the case that the information recording of photography information and others are made in a magnetic information recording area or the like formed on a film surface, the information recording operation is made concurrently with the film winding operation by one frame after, for example, the shutter release taken at photography, and therefore various proposals has been made in order to develop such a mechanism.

In the case that the information recording operation on the photography information or the like is conducted in connection with the aforesaid shutter release operation at photography to record the photography information or the like on the film surface, if some trouble occurs during the photography, the photography information is recorded irrespective of being unnecessary for the photographer.

In such a case, a means is required to rewrite the unnecessary information or the like magnetically recorded thereon. As an example of the means to rewrite the recorded information or the like there may be a device in which the film is rewound by one frame up to a position corresponding to the unnecessary information written film surface immediately after a series of operation for the photography and subsequently the above-mentioned information or the like is rewritten at the same time that the film is again wound by one frame.

However, in the case of a camera in which a single motor takes charge of all the film loading operations, the one-frame film rewinding operation for rewriting the recorded information or the like is required to rely upon the control where the drive system is once set to a rewinding condition before the winding operation. In this case, the roll film is fed to reciprocate between the cartridge and the spool shaft within the camera. Accordingly, it is necessary that the control of the drive system of a camera or the like is executed so that the rewinding drive condition and the winding drive condition do not concurrently occur.

That is, if in the drive system of a camera or the like the rewinding drive condition and the winding drive condition simultaneously occur, more specifically if the gears and others of the rewinding drive system and the winding drive system concurrently come into engagement, the gear trains of both the drive systems pull the roll film in opposite directions, and therefore the drive mechanism gets into a locked state, i.e., an inoperable condition or one in which the roll film is broken and damaged.

Thus, in order to prevent the drive mechanism from falling into the locked state and to certainly ensure the timing for switching between the rewinding drive condition and the winding drive condition, a clutch mechanism and others need to have a sufficient margin or clearance for the switching between rewinding drive system and the winding drive system. This can sacrifice the disposition space for other components within the camera and impose restrictions on the layout or disposition of various other mechanisms also located within the camera.

SUMMARY OF THE INVENTION

Accordingly, it is a main object of the present invention to provide a camera conformable to an Advanced Photo System, which is equipped with a mechanism to surely accomplish switching operations of drive systems when rewriting photography information or the like in a magnetic information recording area or the like on a film surface.

Another object of this invention is to provide a camera for an Advanced Photo System, which is capable of certainly rewriting photography information or the like in a magnetic information recording area or the like on a film surface and further of contributing to the size reduction of the camera itself.

Putting it briefly, the camera according to this invention has a winding drive system depending upon a motor and further includes a planetary clutch mechanism which is provided within the drive system to make the engagement and separation of the drive system in accordance with the rotating directions of the motor, and a differential reduction section is provided within a revolution area of a planetary gear of the planetary clutch mechanism.

In addition to a winding drive system and a rewinding drive system which transfers a power from a single motor, the camera according to this invention includes a first planetary clutch mechanism for releasing or cutting off the transfer within the winding drive system by the rotation of the motor in a first direction, a second planetary clutch mechanism for releasing the transfer within the rewinding drive system by the rotation of the motor in a second direction, and a reduction mechanism for performing the differential reduction of a planetary gear of the first planetary clutch mechanism at the revolution of the planetary gear.

Furthermore, in addition to a winding drive system and a rewinding drive system which transfer the power from a single motor, a camera according to this invention comprises a first planetary clutch mechanism provided within the winding drive system and equipped with a first planetary gear which completes the revolution by a first rotating quantity of the motor, a second planetary clutch mechanism provided with the rewinding drive system and equipped with a second planetary gear which completes the revolution by a second rotating quantity of the motor, and a reduction mechanism for carrying out the differential reduction during the revolution of the first planetary gear, wherein the first rotating quantity is set to be sufficiently larger than the second rotating quantity.

With this construction, at the engagement and out-of-engagement of the drive system according to the rotating directions of the motor within the winding drive system, the planetary clutch mechanism of this camera is capable of certain switching operation through the use of the differential reduction section within the revolution area of its planetary gear.

Moreover, the first planetary clutch mechanism releases the transfer within the winding drive system by the rotation of the motor in the first direction while the second planetary clutch mechanism releases the transfer within the rewinding drive system by the rotation of the motor in the second direction, and the reduction mechanism performs the differential reduction of the planetary gear when the planetary gear of the first planetary clutch mechanism is in revolution.

This and other objects and advantages of the present invention will become further apparent from the following detailed explanation.

In accordance with the present invention, in a camera conforming to an Advanced Photo System, the switching operations of the respective drive systems are surely achievable, for example, in cases where photography information or the like is rewritten in a magnetic information recording area on a film surface, and further it is possible to provide a camera which can contribute to size reduction.

DESCRIPTION OF THE PREFERRED EMBODIMENTS

The present invention will be described hereinbelow through the use of embodiments illustrated.

FIGS. 1 to 6 are illustrations of the appearance of a camera according to a first embodiment of the present invention. This camera conforms to the above-mentioned Advanced Photo System, and is the so-called photographing lens integrated type single-lens reflex camera where the photographing and a camera body are in an integrated relation to each other.

In addition, to the photographing lens of this camera there is applied a variable power zoom lens which is capable of continuously changing the focal length, with the variable focal length range being set, for example, to 25 mm to 100 mm.

Figure 1:
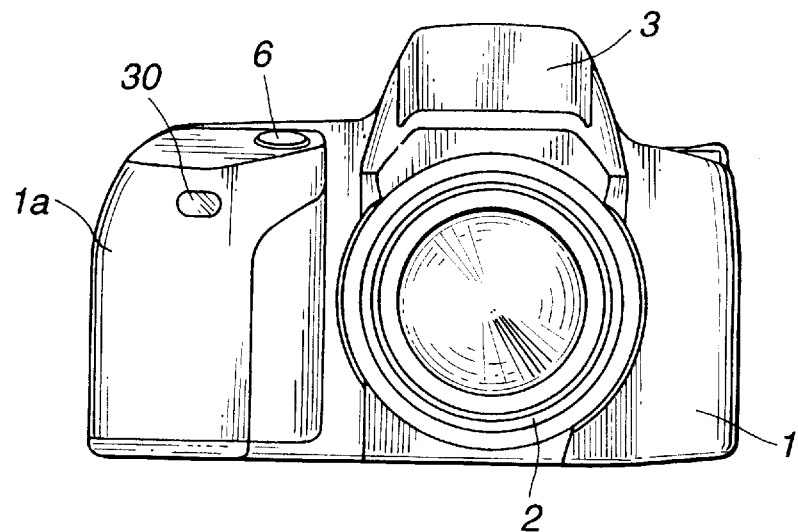
FIG. 1 is a front elevational view showing a camera according to a first embodiment of the present invention.
Figure 2:
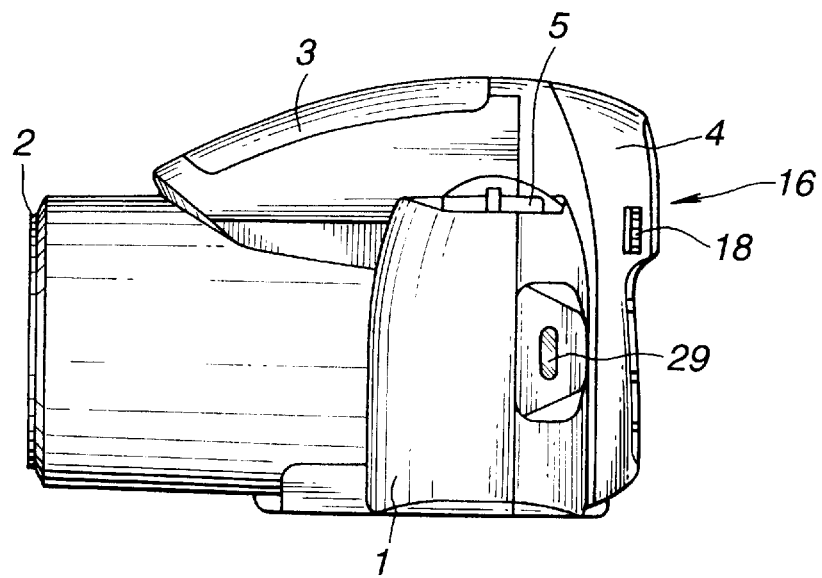
FIG. 2 is a right side elevational view showing the FIG. 1 camera.
Figure 4:
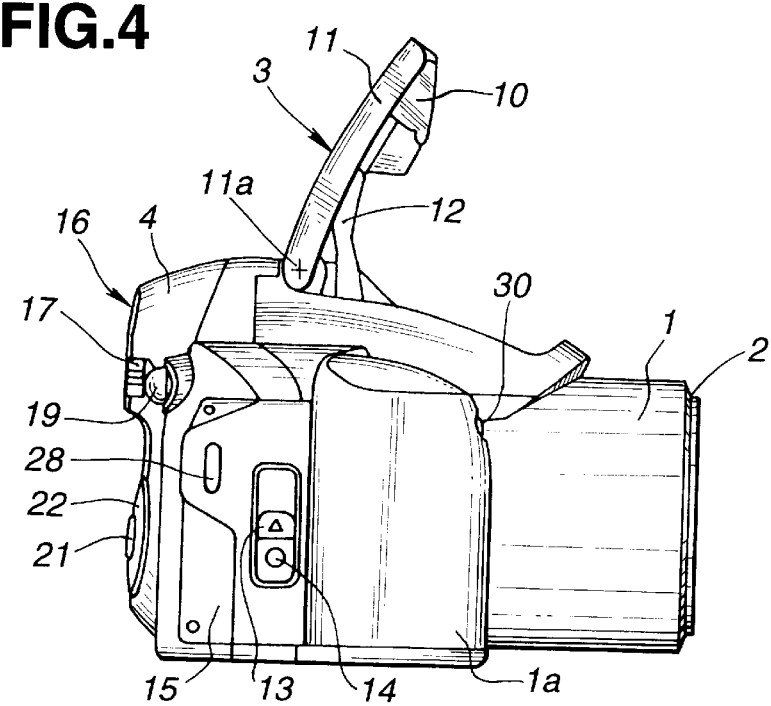
FIG. 4 is a left side elevational view showing the FIG. 1 camera, showing a state that a stroboscopic section is in a popped-up condition.

Furthermore, this camera incorporates a stroboscope device (electric flash equipment), and FIG. 2 shows a housed condition of the stroboscope device and FIG. 4 illustrates an emission allowed condition (popped-up state) thereof.

The aforesaid stroboscope device is provided with the so-called popping-up mechanism which makes the stroboscope protrusively take an emission position (pop up) when an auxiliary light beam is necessary, for example, when the photographing environment is a low-brightness environment.

As shown in FIGS. 1 to 6, the outside construction of this camera relies upon three blocks: a front cover 1, a rear cover 4 and a stroboscopic section 3.

The aforesaid front cover 1 is made to cover the front side of this camera, and at a generally central portion of the front surface, a cylindrical section protruding in front is formed to accept a photographing lens barrel 2 for holding a photographing lens and others. Further, the aforesaid rear cover 4 engages with the front cover 1 to cover the rear side of this camera.

Incidentally, since as mentioned before this camera is the type of allowing The Advanced Photo System, this camera is not equipped with a mechanism which opens and closes, through a rear cover or the like, an opening section made in a rear surface of a camera using a prior 135 type film cartridge or the like.

Furthermore, the aforesaid stroboscopic section 3 assumes the popped-up state in FIG. 4 and is composed of a stroboscopic emission section 10, for example, comprising a Xenon (Xe) tube, a reflector and others, and a stroboscopic cover 11. This stroboscopic section 3 is supported to be rotatable about a shaft portion 11a to above the front cover 1. More specifically, the stroboscopic section 3 is made to be rotatable about the shaft portion 11a acting as a rotating center through an angle of approximately 80 degrees to above this camera. In this case, two stroboscope arms 12 are placed on both end portions of the stroboscopic section 3, respectively, thus restricting the rotating movement and holding the stroboscopic section 3 at a given position at the time of the popped-up condition as shown in FIG. 4.

In terms of the illumination range of the stroboscopic emission section 10 in the popped-up state shown in FIG. 4, the illuminating angle is determined so that it can sufficiently illuminate the photographing range at the closest distance on the wide side (focal length: 25 mm).

Figure 3:
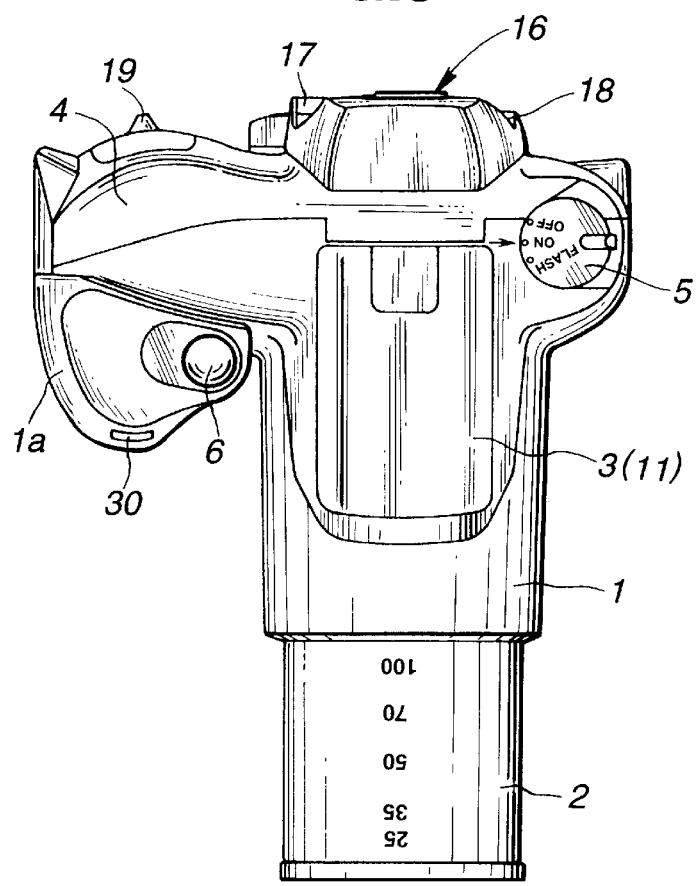
FIG. 3 is a top view showing the FIG. 1 camera, showing a state that a photographing lens is on a telephoto side.

Still further, a gripping section 1a for holding the camera at photography is provided on the left-hand side viewed from the front side of the camera, and as shown in FIG. 3 a shutter release button 6 is located at an upper and front side portion of the gripping section 1a and further an operating member such as a zoom lever 19 is situated on a rear side upper portion of the camera and even a remote control light-receiving section 30 for receiving an optical signal (for example, an infrared beam) from a remote control unit or the like is provided at an upper front side portion of the gripping section 1a.

On the other hand, as mentioned before a quadruple zoom lens having a focal length of 25 mm to 100 mm is applied to the photographing lens of this camera, and this photographing lens is held by the photographing lens barrel 2 fitted in the front side cylindrical section of the front cover 1.

Moreover, the aforesaid photographing lens is designed to freely set its focal length within the above-mentioned range in response to the arbitrary operation of the zoom lever 19. In this instance, the photographing lens barrel 2 is designed so that its overall length becomes larger in accordance with the variation of the focal length from the short focal point (wide) side to the long focal point (tele) side (see FIG. 3).

Furthermore, as shown in FIG. 3, provided at one end portion (a right side upper portion when viewed from the front side of the camera) on the top surface of the camera is a main switch 5 which is a main power supply switch of this camera. This main switch 5 assumes a dial configuration rotatably supported at a camera upper surface portion which is made to take an "OFF" position for setting the power supply condition to the camera to the off state, an "ON" position for establishing the power supply condition to the camera to the on state, a "FLASH" position for popping up the aforesaid stroboscopic section 3 toward the emission position and further for allowing the stroboscopic emission, and other positions. The switching to the respective positions is accomplished through the rotating operation of the main switch 5.

In the case of shifting the stroboscopic section 3 from its popped-up state (the state shown in FIG. 4) to its housed state (the state shown in FIGS. 1, 2 and 3), for example the stroboscopic section 3 is arbitrarily manually pressed toward the top surface side of the front cover 1 of the camera.

Figure 6:
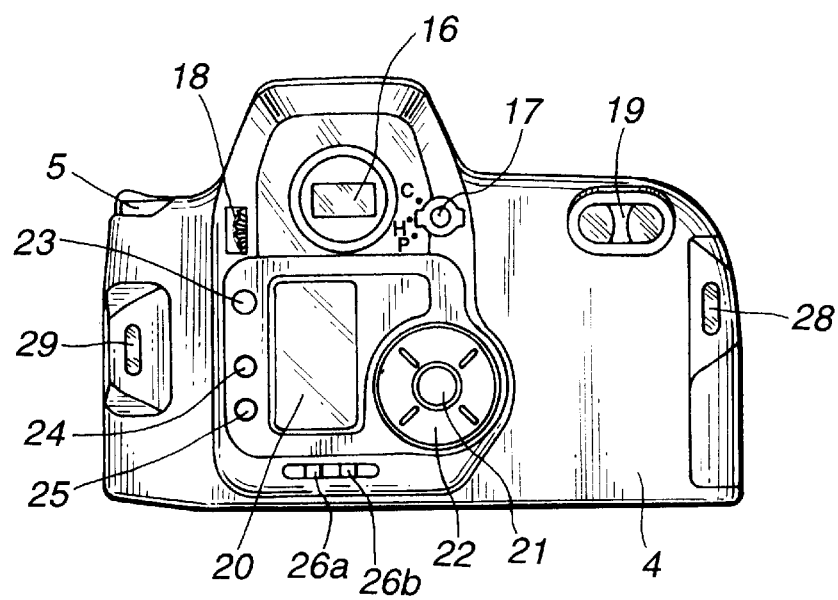
FIG. 6 is a back elevational view showing the FIG. 1 camera.

On the other hand, as shown in FIG. 6 various operating members and others are disposed in the rear surface side of this camera. That is, on an upper side of the generally central portion there is provided an eye-piece section 16 comprising eye-piece lens or the like and available for confirming a subject image at photography or the like. Further, a diopter adjusting dial 18 for adjusting the diopter of the eye-piece lens system is provided on one end portion side (the left side when viewed from the rear surface side of the camera in FIG. 6) of the eye-piece section 16 but in the vicinity of the eye-piece section 16, while a scene switching operating member 17 is disposed on the other end portion side of the eye-piece section 16 but in the vicinity thereof.

This scene switching operating member 17 allows the arbitrary selection and the switching to one of the three kinds of print types employed for The Advanced Photo System: an H type (HDTV) having an aspect ratio of approximately 9:16 which is a standard format, a C type (Classic) having an aspect ratio of approximately 2:3 which is a conventional format, and a P type (Panoramic) having an aspect ratio of approximately 1:3 which is a panoramic format. When the scene switching operating member 17 is rotated clockwise in FIG. 6 by approximately 45 degrees on the basis of the "H" position indicative of the standard format, it reaches the "C" position indicative of the conventional format. On the other hand, when the scene switching operating member 17 is rotated counterclockwise in FIG. 6 by approximately 45 degrees on the basis of the "H" position indicative of the standard format, it reaches the "P" position representative of the panoramic format. Accordingly, the visual field of a viewfinder observable from the eye-piece section 16 is selectable to agree with the respective types, and the print type set here is recorded on a film surface as a portion of photography information or the like at photography in link with an information recording control circuit (not shown) or the like in the camera.

Furthermore, under the eye-piece section 16 is an indication section 20 which is constructed with a liquid crystal display (LCD) or the like to indicate various information such as a film counter and a photographing mode. A mode selection button 22 for selection of a photographing mode is located on one end side (the right side when viewed from the rear surface side of the camera in FIG. 6) of the indication section 20 and in the vicinity of this indication section 20, while on the other end side (the left side when viewed from the rear surface side of the camera in FIG. 6) there are placed an emission mode selection button 23 for setting the stroboscopic emission condition from the above, a self remote control button 24 for setting the use of a remote control unit, the use of a self-timer and others, a counterlight correction button 25 for performing the exposure correction or the like at the counterlight, and other devices. These buttons 23, 24, 25 and others are designed to set up various modes when pressed.

Still further, in the case of this camera, in addition to the ordinary mode (full-auto mode) by which photographing conditions are automatically set for the common photography, the mode selection button 22 allows setting four kinds of modes (a portrait mode, a scenery mode, a stop action mode (a shutter priority mode), and a night view mode). For setting the respective modes, the aforesaid mode selection button 22 is made to slide in four given directions. In addition, a full-auto button 21 is provided in a central portion of the mode selection button 22, and this full-auto button 21 has a function to instantaneously return the photographing mode set through the mode selection button 22 or the like to the ordinary mode (the full-auto mode).

Moreover, under the aforesaid indication section 20 there are a date mode switching button 26a and a date setting button 26b. The date mode switching button 26a is for the purpose of switching the information on the date of the photography, for example, the date modes including "year/month/day", "month/day/year", "day/month/ year", "day/hour/minute" and "no recording", whereas the date setting button 26b is for the purpose of setting year, month, day, hour, minute and others. Both buttons 26a, 26b are made to set the modes when pressed.

Besides, in both end portions of the rear surface side of this camera there are made opening portions 28, 29 for the connection of a neck strap or the like used when carrying this camera.

Figure 5:
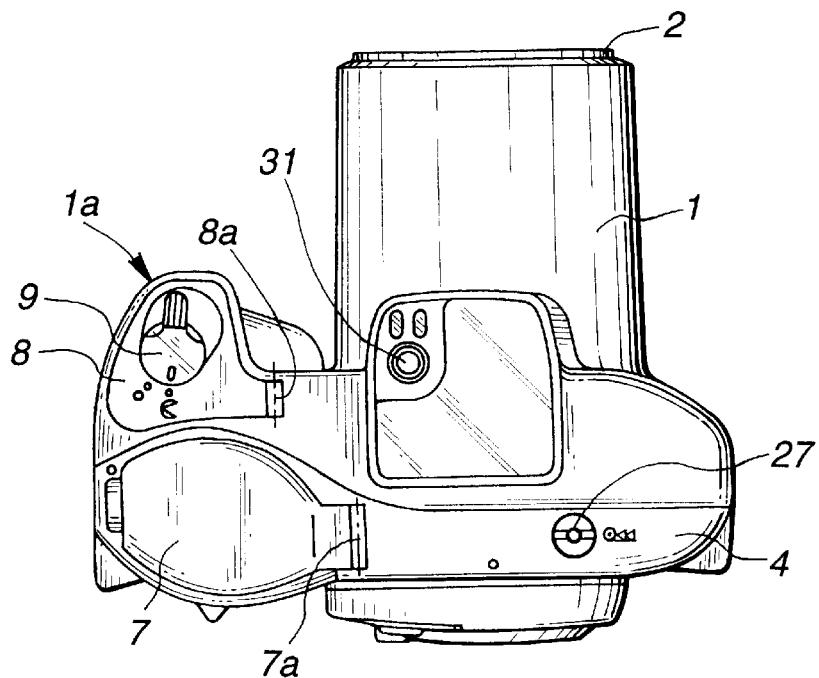
FIG. 5 is a bottom view showing the FIG. 1 camera.

Furthermore, as shown in FIG. 5, in the bottom surface portion in the rear cover 4 side of this camera, on one end side (the side where the gripping section 1a is provided) thereof there is placed a cartridge cover 7 for covering an opening section for insertion and detachment of a cartridge being a film mounting section for accommodating a roll film. This cartridge 7 is rotatably supported by a shaft member 7a in the bottom surface portion of the rear cover 4. In this case, the cartridge cover 7 is made to be rotatable about the shaft member 7a toward the outside of the camera within an angular range of approximately 100 degrees.

The cartridge cover 7 can release its locked state in a manner to slide a cartridge cover opening and closing lever 13 (see FIG. 4) placed at a side surface portion of the gripping section 1a. A locking button 14 is located in a central portion of the cartridge cover opening and closing lever 13, which prevents it from being opened in error due to a careless operation. More specifically, the cartridge cover opening and closing lever 13 is slidable only when the locking button 14 is pressed by a given quantity. Only in this case, the cartridge cover 7 comes into the open state. In addition, in the vicinity of the cartridge cover opening and closing lever 13, there is provided a lever cover 15 which is a cover for protecting the cartridge cover opening and closing lever 13.

In this camera, when the cartridge cover 7 is operated to the open state, the film loading is completed only in the manner that the cartridge cover 7 is rotated into the closed state after the cartridge accommodating the roll film is housed in the camera body, that is, it adopts the so-called drop-in loading method.

Furthermore, as shown in FIG. 5, in a bottom surface portion of the camera in the front cover 1 side and in the vicinity of the cartridge cover 7 and at a position corresponding to a bottom surface portion of the gripping section 1a, there is provided a battery cover 8 for covering an opening section which is made to insert and remove power supply batteries, for example, lithium batteries (two batteries), for the power supply to this camera. This battery cover 8 is rotatably supported by a shaft member 8a in a bottom surface portion of the front cover 1, whereupon the battery cover 8 is rotatable about the shaft member 8a toward the exterior of the camera within an angular range of approximately 100 degrees.

Still further, in the vicinity of the battery cover 8, there is provided an opening and closing lever 9 for opening and closing this battery cover 8, with the rotating operation of the opening and closing lever 9 releasing its locked state.

FIG. 5 shows a state that the opening and closing lever 9 is at a lock releasing position, and in this state the locked state of the battery cover 8 is releasable. In addition, the battery cover 8 is set to the locked state with respect to the front cover 1 in a manner that the opening and closing lever 9 undergoes the clockwise rotation from the FIG. 5 state.

Besides, placed at the other end portion of the bottom surface section of the camera is a halfway rewinding button 27 for rewinding the used film into the cartridge in the middle of photography or the like, and in a central front surface side of the bottom section there is provided a tripod mounting screw portion 31 and others for installing the camera on a tripod or the like.

Figure 7:
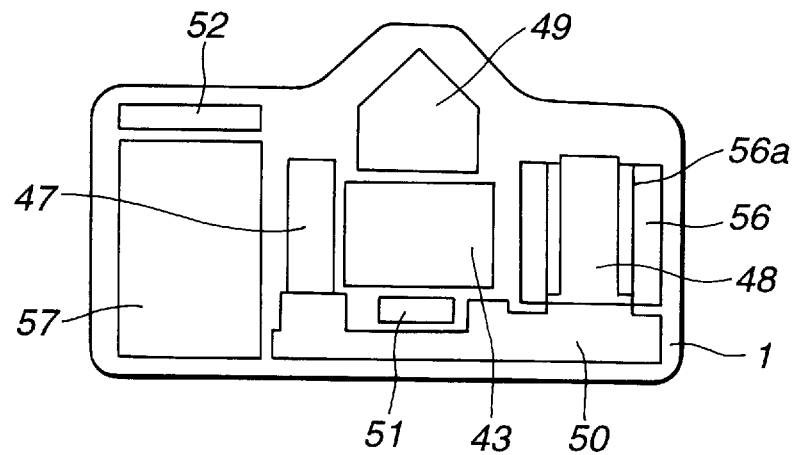
FIG. 7 is a schematic illustration of a disposition of an internal unit viewed from a front side of the FIG. 1 camera.
Figure 8:
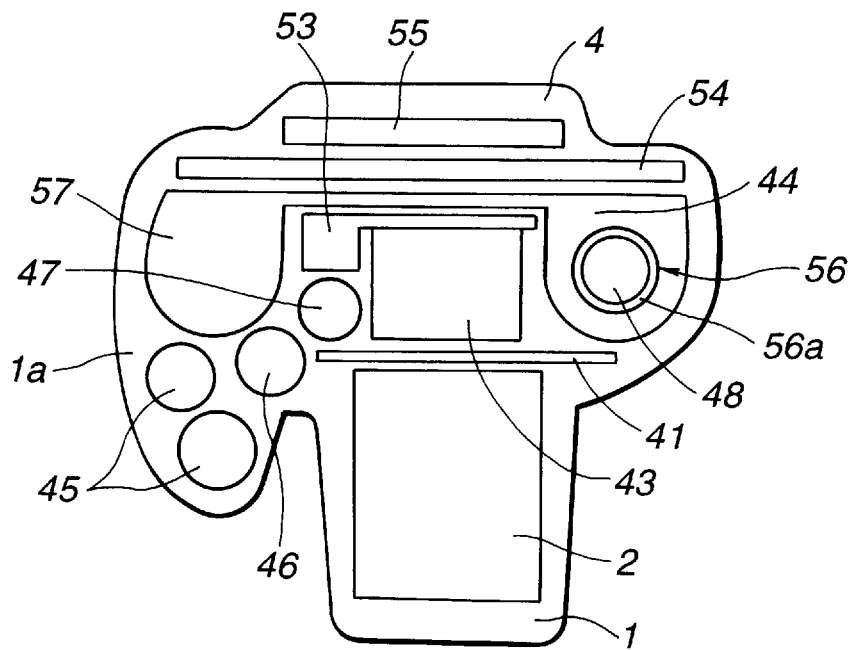
FIG. 8 is a schematic illustration of a disposition of an internal unit viewed from a top side of the FIG. 1 camera.

Secondly, referring to FIGS. 7 and 8, a description will be made hereinbelow of a structure of an internal unit of the above-described camera. FIGS. 7 and 8 do not illustrate the disposition of all the internal units in the interior of the camera but some portions are omitted for brevity, that is, for avoiding the complication of the drawings.

This camera is, as mentioned before, a lens integrated type single-lens reflex camera where the photographing and a camera body are in an integrated relation to each other, and as shown in FIG. 8 the photographing lens is held within the photographing lens barrel 2 placed in the cylindrical section made on the front surface side of the front cover 1.

As shown in FIGS. 7 and 8, in a substantially central portion of this camera there is disposed a mirror box 43 composed of a quick return mirror or the like adopted for a common single-lens reflex camera. Under it is an auto-focus (AF) sensor unit 51 for control of the distance measurement.

On the other hand, above the aforesaid mirror box 43 is a viewfinder unit 49 comprising, for example, a focusing screen, a roof mirror, or the like, whereupon a light beam incident on the photographing lens from a subject is led through the eye-piece lens system (not shown in FIGS. 7 and 8) to the aforesaid eye-piece section 16 (see FIG. 6).

Disposed on the rear side of the mirror box 43 is a shutter unit 53 comprising a general focal plane shutter or the like, which takes charge of the exposure control.

On the rear side of this shutter unit 53 is a first body 44 constituting the camera body, and in a substantially central portion of this first body 44 is an exposure opening section 44g (see FIG. 9) whereby a light beam from a subject advances up to the film surface for the exposure.

In addition, the first body 44 integrally has a cartridge compartment 57 defined in its one end portion (the side on which the gripping section 1a is disposed in FIG. 8) and a spool compartment 56 made at a substantial center of the other end portion which rotatably supports a spool shaft 56a serving as a first driven member and a film winding member. Further, a film traveling passage is formed in the vicinity of the exposure opening section 44g between the cartridge compartment 57 and the spool compartment.

The cartridge compartment 57 of the first body 44 is disposed on the rear side of the gripping section 1a and at a position corresponding to the cartridge cover 7 (see FIG. 5).

Furthermore, a second body 54 is provided on the rear side of the first body 44. This second body 54 intercepts the light going from the cartridge compartment 57 to the spool compartment 56 and ensures a dimension within the film traveling passage in the vicinity of the exposure opening section 44g through the use of a pressure plate section (not shown) or the like integrally constructed therewith so that the necessary flatness of the film is achievable.

In this camera, the aforesaid pressure plate section (not shown) is of the common type and is, for example, such that a projection portion is formed on a pressure plate surface according to a molding technique to attain the necessary dimension within the film traveling passage.

On the other hand, the aforesaid gripping section 1a accepts two power supply batteries 45, an electric flash capacitor 46 and others on the front side of the cartridge compartment 57.

Furthermore, as shown in FIG. 8, between the mirror box 43 and the photographing lens barrel 2 is a body plate 41 which is produced, for example, with a metallic plate such as a stainless steel plate having a thickness of approximately 1 mm to provide an extremely higher strength and a flatness accuracy in comparison with the other units. Further, the photographing lens barrel 2 and the mirror box 43 are directly fixed to the body plate 41, and all the internal units of this camera are also held by the body plate 41.

Still further, for the attachment to the armor members, the body plate 41 is fixedly secured through screws or the like to the front cover 1, whereupon the interior is held with the most excellent members and the first and second bodies 44, 45 and others are constructed so as not to directly come into contact with the armor members (except a positioning member which will be described later). Accordingly, it is possible to provide a construction which is capable of preventing the respective cover members being the armor members from deforming, for example, due to the impact from the external and the external force and further which is susceptible of eliminating the strain or the like occurring in the interior of the camera to the utmost by a combination of the armor members.

On the other hand, a power source for this camera is roughly divided into four systems: a mirror shutter motor 47, a film loading motor 48, an AF motor (not shown) and an AV motor (not shown).

The mirror shutter motor 47 takes charge of the control of up and down movement of the aforesaid quick return mirror and further of the control of charging for the focal plane shutter, whereas the film loading motor 48 is in charge of the entire film loading operation and the variable power (zooming) operation of the photographing lens.

Moreover, the AF motor (not shown) is disposed within the photographing lens barrel 2 to execute the focusing control, while the AV motor (not shown) conducts the control of the aperture.

Of these motors, the mirror shutter motor 47 and the film loading motor 48 are located in the body side and held on a motor base (which will be described in detail later, see FIG. 10) to organize a motor unit 50. This motor unit 50 is mounted from the bottom surface side of the camera and fixed through the mirror box 43, the first body 44 and others to be positioned at a given place within the camera.

The mirror shutter motor 47 is disposed without waste in a space surrounded by the shutter unit 53 (drive control section thereof), the electric flash capacitor 46, the mirror box 43 and others.

The film loading motor 48 is located in the interior of the spool shaft 56a within the spool compartment 56.

Moreover, a one-way clutch unit 52 (see FIG. 14 for details) is disposed above the gripping section 1a, and a substrate 55 comprising circuits or the like for controlling the various operating members in the camera rear surface section is placed within the rear cover 4 on the rearmost section side of this camera.

Subsequently, a detailed description will be made hereinbelow of an internal structure of the camera.

Figure 9:
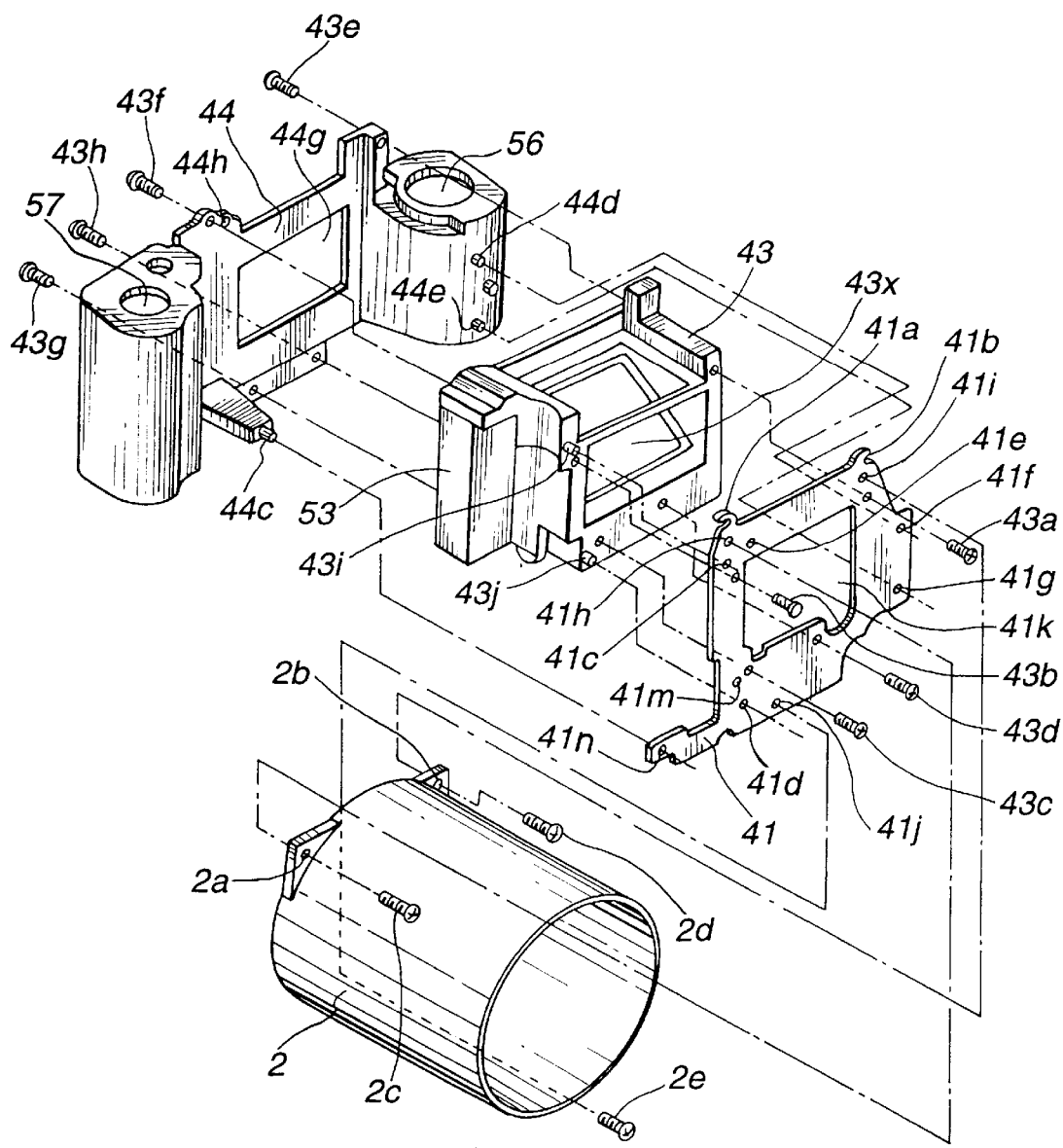
FIG. 9 is an exploded perspective view schematically showing a construction of a principal unit in the vicinity of a body plate in the interior of the FIG. 1 camera.
Figure 10:
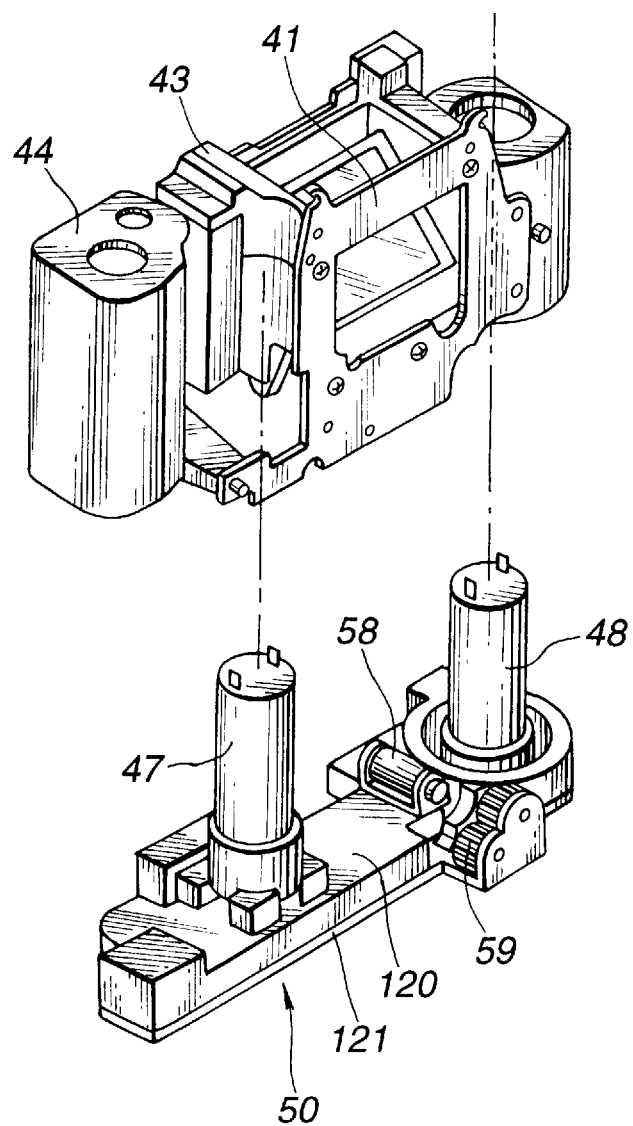
FIG. 10 is an exploded perspective view schematically showing a principal unit and motor unit of the FIG. 1 camera.

First of all, referring to FIGS. 9 and 10 a description will be taken of a principal unit near the body plate 41.

As shown in FIG. 9, made in a substantially central portion of the body plate 41 is an opening section 41k allowing the subject light beam from the photographing lens to pass, and formed around this opening section 41k is a section for the attachment of the first body 44, the mirror box 43, the photographing lens barrel 2 and others.

The aforesaid body plate 41 is, as mentioned before, constructed of, for example, a metallic plate such as a stainless steel plate having a thickness of approximately 1 mm, and for a high-quality flatness, does not completely undergo the processing such as bending and restriction.

The mirror box 43 contains a general quick return mirror 43x therein, and the up and down control of this quick return mirror 43x comes under a drive system (not shown in FIG. 9) composed of the mirror shutter motor 47 and others.

As described above, the mirror box 43 is directly fixed to the body plate 41, and in this case positioning bosses 43i, 43j placed on the front surface side of the mirror box 43 engage with fitting holes 41c, 41d provided on the body plate 41 so that the mirror box 43 is positioned with respect to the body plate 41. Further, the body plate 41 and the mirror box 43 are directly fixed firmly at four places through self-tapping screws 43a, 43b, 43c and 43d.

The positions of the self-tapping screws 43a, 43b, 43c and 43d, exist in the circumferential portion of the box structural section on the mirror box 43 side and are portions where the box structural members continuously stand in the direction of the optical axis, and particularly portions having a sufficient strength in the direction of the optical axis.

On the other hand, on the rear surface side of the mirror box 43 there is located a shutter unit 53 comprising a common focal plane shutter or the like, with this shutter unit 53 being fixed through screws (not shown) or the like from the rear surface side of the mirror box 43 in a similar way.

In addition, on the further rear side of the mirror box 43 is the aforesaid first body 44 which has the exposure opening section 44g for determining the photographing scene size as described above. Provided at one end portion thereof is the foregoing cartridge compartment 57 for accommodating a cartridge mounted according to the drop-in method through the opening section covered with the cartridge cover 7 on the bottom surface side of the camera, while integrally formed on the other end portion thereof is the spool compartment 56 which is made to rotatably support the spool shaft 56a (not shown in FIG. 9, see FIGS. 7 and 8) for taking up the roll film fed from the interior of the cartridge.

Between the mirror box 43 and the first body 44, two positioning bosses (not shown) provided toward the rear side of the mirror box 43 are engaged with two fitting holes 44*h* (only one is illustrated in FIG. 9) provided on the first body 44 side as in the case of the fitting and fixation between the mirror box 43 and the body plate 41, so that the first body 44 is positioned relative to the body plate 41. Further, the first body 44 and the mirror box 43 are directly fixed firmly at four places through self-tapping screws 43*e*, 43*f*, 43*g* and 43*h*.

The above-mentioned units are formed to achieve the size reduction to utmost, and hence, for example in the case of the first body 44, it is considered that as the single unit the cartridge compartment 57 and the spool compartment 56 tend to deform with respect to the vicinity of the exposure opening section 44*g*. For this reason, for preventing such deformation, bosses are placed at three places of the first body 44.

More specifically, bosses 44*d*, 44*e* are provided on the front side of the spool compartment 56 and these bosses 44*d*, 44*e* are made to engage with fitting holes 41*f*, 41*g*, with the result that, even if an external force or the like, such as twisting, is slightly exerted on the spool compartment 56, it is correctly shifted to a given position to prevent the deformation.

In addition, on the front side of the cartridge compartment 57 there is provided a boss 44*c* which is fitted in a fitting hole 41*n* made on the body plate 41 side, thereby similarly preventing the deformation. In this instance, the boss 44*c* is made to have a length longer by approximately 2 mm than that of the bosses 44*d*, 44*e*, and when the boss 44*c* is fitted in the fitting hole 41*n* of the body plate 41, its tip portion protrudes toward the front surface side of the body plate 41.

Furthermore, in a state where the mirror box 43 and the first body 44 are fixedly secured to the body plate 41, the viewfinder unit 49 (not shown in FIG. 9, see FIG. 7) stands above the mirror box 43 while the motor unit 50 (not shown in FIG. 9, see FIGS. 7 and 10) resides under the first body 44.

On the other hand, the aforesaid photographing lens barrel 2 is made to be fixedly attached from the front surface side of the body plate 41. That is, two positioning fitting holes 41*e*, 41*m* for the photographing lens barrel 2 are bored in the body plate 41, and these positioning fitting holes 41*e*, 41*m* are engaged with positioning bosses (not shown) located toward the rear side of the photographing lens barrel 2, so that the photographing lens barrel 2 is positioned with respect to the body plate 41.

In addition, on the rear end side of the photographing lens barrel 2 there are formed three flange portions 2*a*, 2*b* (only two flange portions are illustrated in FIG. 9) each of which has a through-hole. Further, screw tightening portions 41*h*, 41*i* and 41*j* are provided at positions of the body plate 41 side corresponding to these through-holes. These screw tightening portions 41*h*, 41*i* and 41*j* are tapped so that the photographing lens barrel 2 is firmly fixed through three screws 2*c*, 2*d*, 2*e* to the front surface side of the body plate 41.

Thus, the principal units including the photographing lens barrel 2, the mirror box 43 and the first body 44 are firmly held with respect to the body plate 41. Further, the principal units integrated are fixedly secured through only the body plate 41 with respect to the armor members (the respective cover members, not shown in FIG. 9) of the camera.

In this case, fitting portions 41*a*, 41*b* and others provided above the body plate 41 come into contact with a fitting portion provided inside the armor members of the camera so that the body plate 41 is fixed to the armor members of the camera.

In FIG. 9, in terms of the fixing members between the body plate 41 and the armor members of the camera, only the fitting portions 41*a*, 41*b* are illustrated and detailed descriptions thereof are omitted.

Thus, the principal units integrated or the like are fixed to the armor members of the camera through only the body plate 41, and hence, even if, for example, an external force or the like is applied to the armor members of the camera, the external force or the like does not have influence on the principal units and others within the camera. In addition, the armor members are made to be as thin as possible for the purpose of the size and weight reduction of the camera itself.

FIG. 10 shows a state that the motor unit 50 is mounted on the principal units, i.e., the principal units including the mirror box 43 and the first body 44 integrated and held by the body plate 41. In FIG. 10, for avoiding the complication of the illustration, the photographing lens barrel 2, being a portion of the principal units, is omitted from the illustration.

The motor unit 50 is mounted from below the principal units and positioned. The motor unit 50 is, as described before, composed of the mirror shutter motor 47, the film loading motor 48 and others.

That is, the housing of the motor unit 50 is formed by joining a first motor base 120 and a second motor base 121 through screws or the like, and at given places on the first motor base 120 of this housing there are disposed the mirror shutter motor 47 and the film loading motor 48 which take perpendicular positions relative to the motor base. A reduction drive system is provided within the housing of the motor unit 50 below the mirror shutter motor 47 and the film loading motor 48.

Furthermore, the film loading motor 48 also acts as the drive system for the variable power (zooming) operation of the photographing lens, and hence a clutch mechanism is provided in the gear train composing the reduction drive system, with the result that switching is possible between the drive system for the film loading operation and the drive system for the zooming operation of the photographing lens.

The aforesaid clutch mechanism has two stopping positions at each of which the transfer of the rotational drive force of the film loading motor 48 in the forward and reverse directions is possible, and therefore a direct-advance solenoid plunger 58 for switching is used. This direct-advance solenoid plunger 58 is disposed on the top surface side of the first motor base 120 and the switching operation is made by driving a lever member (not shown).

Incidentally, although not shown in FIG. 10, within the motor unit 50, the rotary shafts of the mirror shutter motor 47 and the film loading motor 48 are substantially disposed in parallel, and drive forces of the respective motors 47, 48 are transferred through a pinion gear on the rotary shafts of the motors 47, 48 to the gear trains organizing the respective reduction drive systems (the details will be described later).

In the case of the gear train for the zooming operation, since there is a need to transfer the driving force of the film loading motor 48 to the interior of the photographing lens barrel 2, the rotating direction is changed through, for example, a bevel gear. Further, the driving force of the film loading motor 48 is transferred through a zoom system drive gear train 59 or the like to a gear train of a zoom drive system placed in the photographing lens barrel 2.

Subsequently, a description will be made hereinbelow of the drive system of the camera. The description on the mirror shutter drive system, the zoom drive system and others will be omitted because they are not directly concerned with this invention, and the description will be taken of only the drive system (which will be referred hereinafter to as a film drive system) for the film loading operation with reference to FIGS. 11 to 16.

Figure 11:
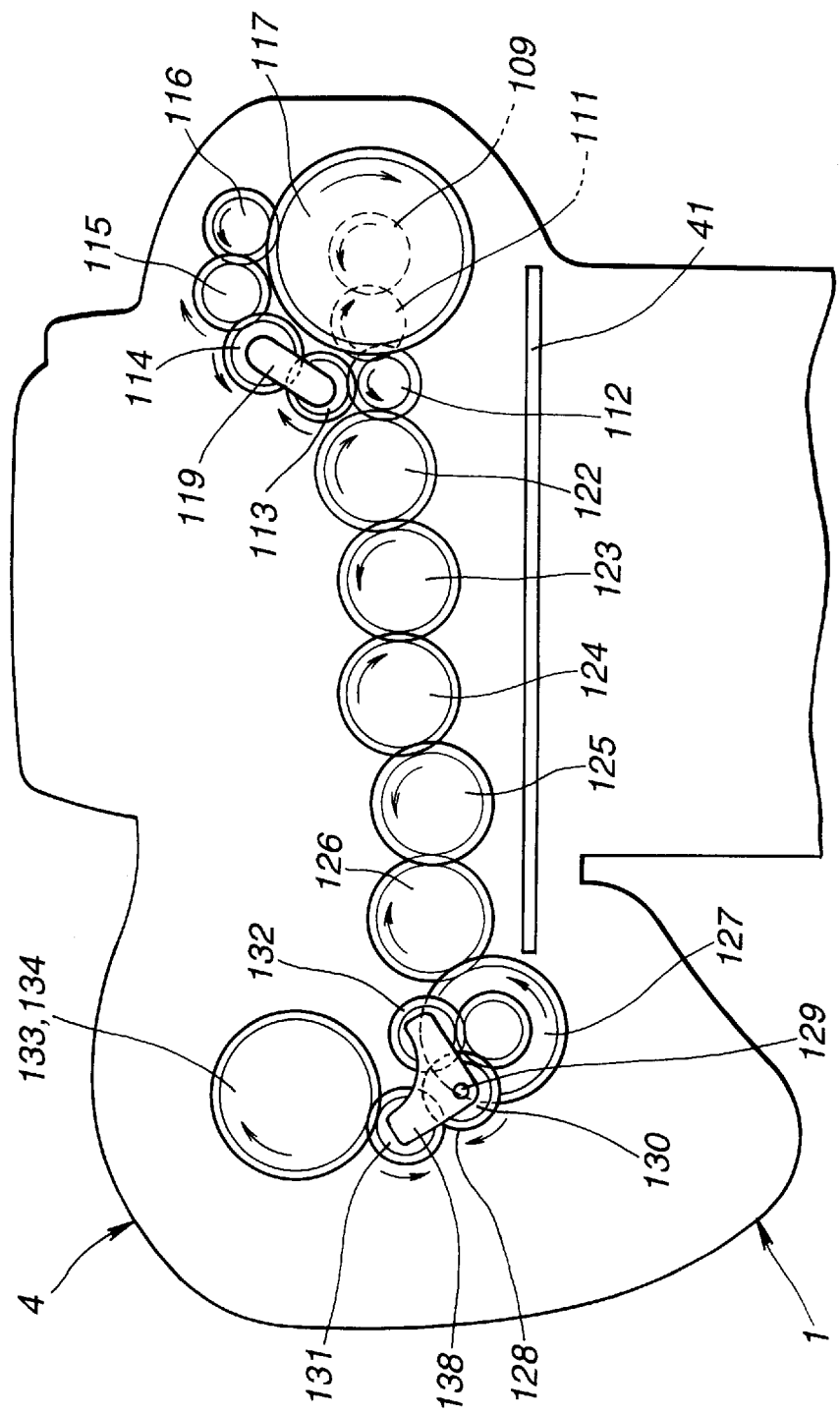
FIG. 11 is a schematic illustration of a disposition of a gear train of a film drive system viewed from a top side of the FIG. 1 camera, showing a film winding and initial loading state.

In FIG. 11, in addition to the gear train of the film drive system only the positional relationship among the outlines of the front cover 1, the rear cover 4 or the like being the armor members and the body plate 41 are illustrated, while the other internal structural members of the camera are omitted for avoiding the complication of the illustration.

Figure 12:
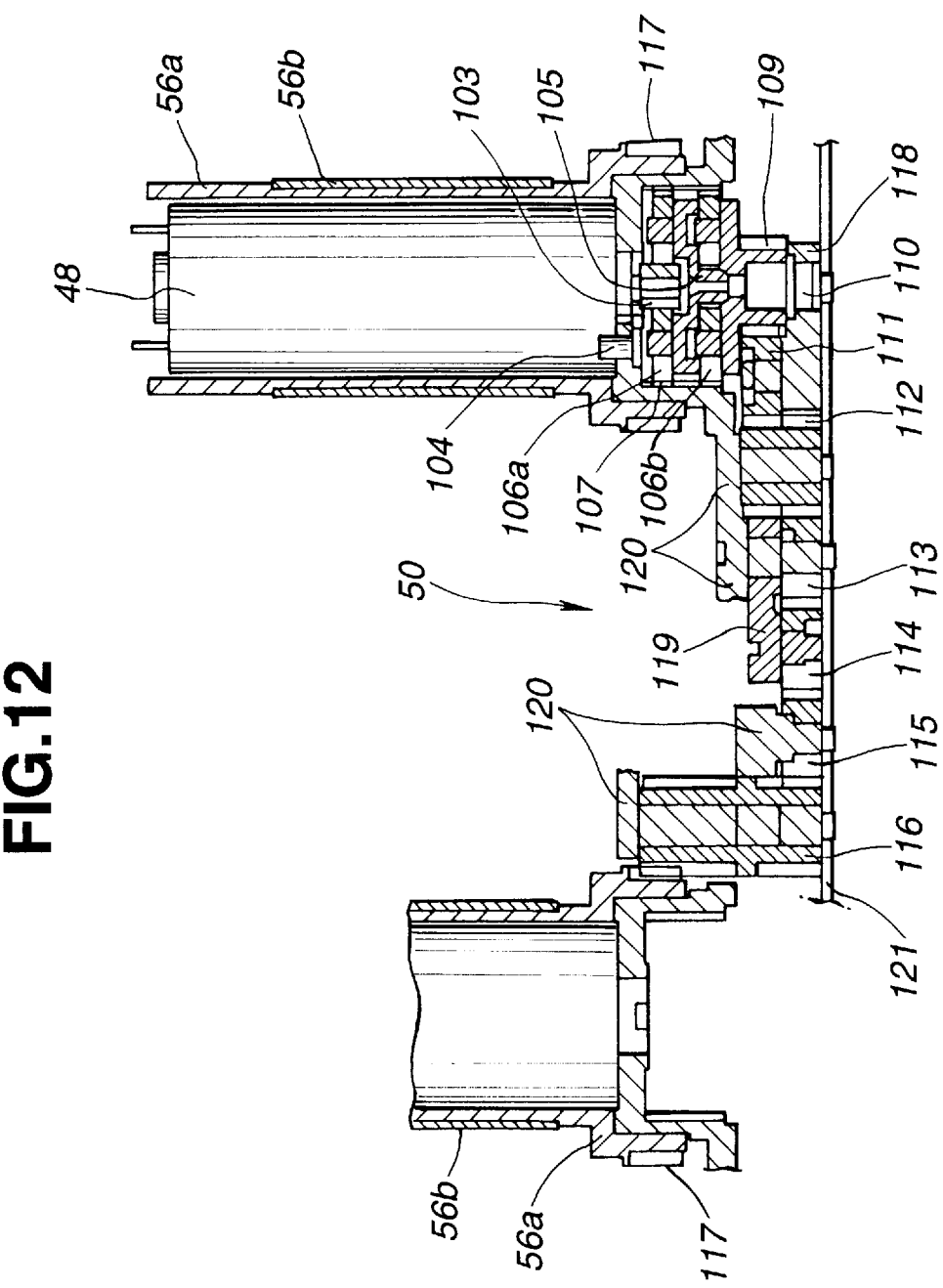
FIG. 12 is a development elevational view showing an engagement condition of a gear train of a film winding drive system of the FIG. 1 camera.

Furthermore, in FIG. 12, although the spool shaft 56a is shown at two places, this is because of the development of the gear train, and hence this illustration does not signify the presence of two spool shafts 56a.

First, an initial reduction section will be described with reference to FIGS. 11 and 12.

As shown in FIG. 12, the film loading motor 48 is fixed through two motor screws 104 to the first motor base 120 being an upper side structural base of the motor unit 50. A pinion gear 103 is integrally placed on the rotary shaft of the film loading motor 48.

The pinion gear 103 is engaged with three planetary gears 106a, and their positions are maintained by three trisection shafts protruding on a first reduction gear 105. The planetary gear 106a meshes, at its outer circumferential side, with an internal gear 107 integrally constructed with the first motor base 120. This internal gear 107 is stationary, and hence the planetary gear 106a revolves by the rotation of the film loading motor 48, so that the first reduction gear 105 takes the differential action.

In addition, a second reduction gear 109 is placed coaxially with the pinion gear 103. The rotating center of this second reduction gear 109 is positioned through an arm shaft 110 fixed to a second motor base 121 being a lower structural base of the motor unit 50, and in addition to the aforesaid first reduction gear 105, three planetary gears 106b are also disposed relative to the second reduction gear 109, and engaged with the internal gear 107. Further, the planetary gear 106b revolves by the rotation of the film loading motor 48, with the result that the second reduction gear 109 takes the differential action.

With the above-mentioned two-stage differential mechanism, the second reduction gear 109 rotates at the following reduction ratio with respect to the pinion gear 103 directly fitted to the film loading motor 48 on the condition that the number of teeth of the pinion gear 103 =12, the number of teeth of the first reduction gear 105 =12 and the number of teeth of the internal gear 107=66.

$$((12+66)/12)^2=6.5^2$$

where ^ signifies the power.

In this instance, in the case that the final output gear rotates by "1/a" in response to the rotation of the motor by "1", the denominator "a" is referred to as the reduction ratio.

Furthermore, as shown in FIG. 11, the second reduction gear 109 is provided at one end portion on the side opposite to the gripping section (1a) side of this camera, i.e., at the end portion on the side where the spool compartment (56) exists. That is, as shown in FIG. 12, the second reduction gear 109 is provided coaxially with the film loading motor 48, and since, as described before, the film loading motor 48 is set within the spool shaft 56a, the second reduction gear 109 is also disposed coaxially with a spool gear 117 integrally set to the spool shaft 56a.

As shown in FIG. 11, the output of the second reduction gear 109 is transferred to a first W gear 111 and a second W gear 112 and is branched through the second W gear 112 into two directions of a third W gear 113 on the winding drive system side and a first RW gear 122 on the rewinding drive system side.

In this case, the winding drive system is composed of a gear train for rotating the spool shaft 56a to wind the film within the cartridge on the spool shaft 56a side, whereas the rewinding drive system is made up of a gear train constituting an initial forwarding mechanism for rewinding the film within the cartridge and further for rotating a cartridge shaft, which is a second driven member and a film rewinding member, in a direction of forwarding the film to the exterior of the cartridge.

This film initial forwarding mechanism is a mechanism inherent in a camera or the like which adopts a film cartridge in The Advanced Photo System.

The first W gear 111 is supported by a W gear arm 118 as shown in FIG. 12. This W gear arm 118 is the so-called planetary arm, and a frictional engagement is provided through a wave washer (not shown) or the like with the first W gear 111. This is for releasing the engagement between the first W gear 111 and the second W gear 112 by the revolution of the W gear arm 118. In this camera, in the case that the driving force of the film loading motor 48 is transferred to the zoom drive system (not shown) side, the W gear arm 118 revolves. However, the description thereof will be omitted for brevity.

Furthermore, the first W gear 111 is held at the position as shown in FIG. 11 in the middle of loading the film irrespective of the rotating direction of the film loading motor 48, and the first W gear 111 and the second W gear 112 are always in the engaged relation to each other.

On the other hand, the gear train constituting the winding drive system, i.e., the second W gear 112, a third W gear 113, a fourth W gear 114, a fifth W gear 115 and a sixth W gear 116, is disposed in the vicinity of the spool compartment (56) to surround it, and the sixth W gear 116 is in an engaging relationship with the spool gear 117. In this instance, in the case of winding the film, the second reduction gear 109 is rotated counterclockwise in FIG. 11 to rotate the spool gear 117 clockwise, so that the spool shaft 56a is rotated in the direction of winding the film.

The third W gear 113 and the fourth W gear 114 (a first planetary gear) are rotatably supported at opposite end portions of the first clutch arm 119, respectively, and are in engaging relation to each other, and a frictional engagement is provided through a wave washer (not shown) or the like thereto, thus composing a first planetary clutch mechanism.

On the other hand, in the gear train organizing the rewinding drive system and the forwarding drive system, the second W gear 112 is always in engaging relation to the first RW gear 122, and hence the idle gear train from the first RW gear 122 through a second RW gear 123, a third RW gear 124 and a fourth RW gear 125 to a fifth RW gear 126 are always in rotating condition regardless of the rotating direction of the film loading motor 48.

The fifth RW gear 126 is engaged with a large gear portion of a sixth RW gear 127, whereas a small gear portion of the sixth RW gear 127 is meashed with a seventh RW gear 128. The gears from the second W gear 112 to the sixth RW gear 127 constituting a gear train are located within the motor unit 50.

The seventh RW gear 128 and an eighth RW gear 130 are set at opposite end portions of an RW shaft 129 (see FIGS. 13 and 14) being a shaft member, respectively. Whereupon, the driving force from the gear train within the motor unit 50 is transferred to the upper portion side of the cartridge compartment 57. In this case, one end portion of the RW shaft 129 on the side where the seventh RW gear 128 resides is rotatably supported by the first body 44.

Moreover, of the gear train constituting the rewinding drive system and the forwarding drive system, the respective gears from the first RW gear 122 to the sixth RW gear 127 are, as mentioned before, disposed within the motor unit 50. In this case, the respective gears are positioned by shaft portions protruding from the first motor base 120, and the restriction thereof in the thrust directions is made by the second motor base 121.

The eighth RW gear 130 serves as a sun gear for second planetary gears, i.e., two gears (a ninth RW gear 131 and a tenth RW gear 132) held on two arm portions of a second clutch arm 138 having an L-like configuration.

More specifically, the ninth and tenth RW gears 131, 132, which are the second planetary gears, are rotatably supported by shaft portions integrally constructed with the respective arm portions of the second clutch arm 138, and a friction engagement is provided thereto by means of a wave washer (not shown) or the like. Accordingly, the second clutch arm 138 is made to revolve in accordance with the rotating direction of the eighth RW gear 130, thus organizing a second planetary clutch mechanism.

In the state as shown in FIG. 11, the second clutch arm 138 is subjected to the clockwise rotation of the eighth RW gear 130 to rotate in the same direction, and the ninth RW gear 131 rotatably supported at the one arm portion of the second clutch arm 138 is in engaging relation with an eleventh RW gear 133. This state corresponds to the development placed on the left-hand side with respect to the eighth RW gear 130 in FIG. 13.

Figure 13:
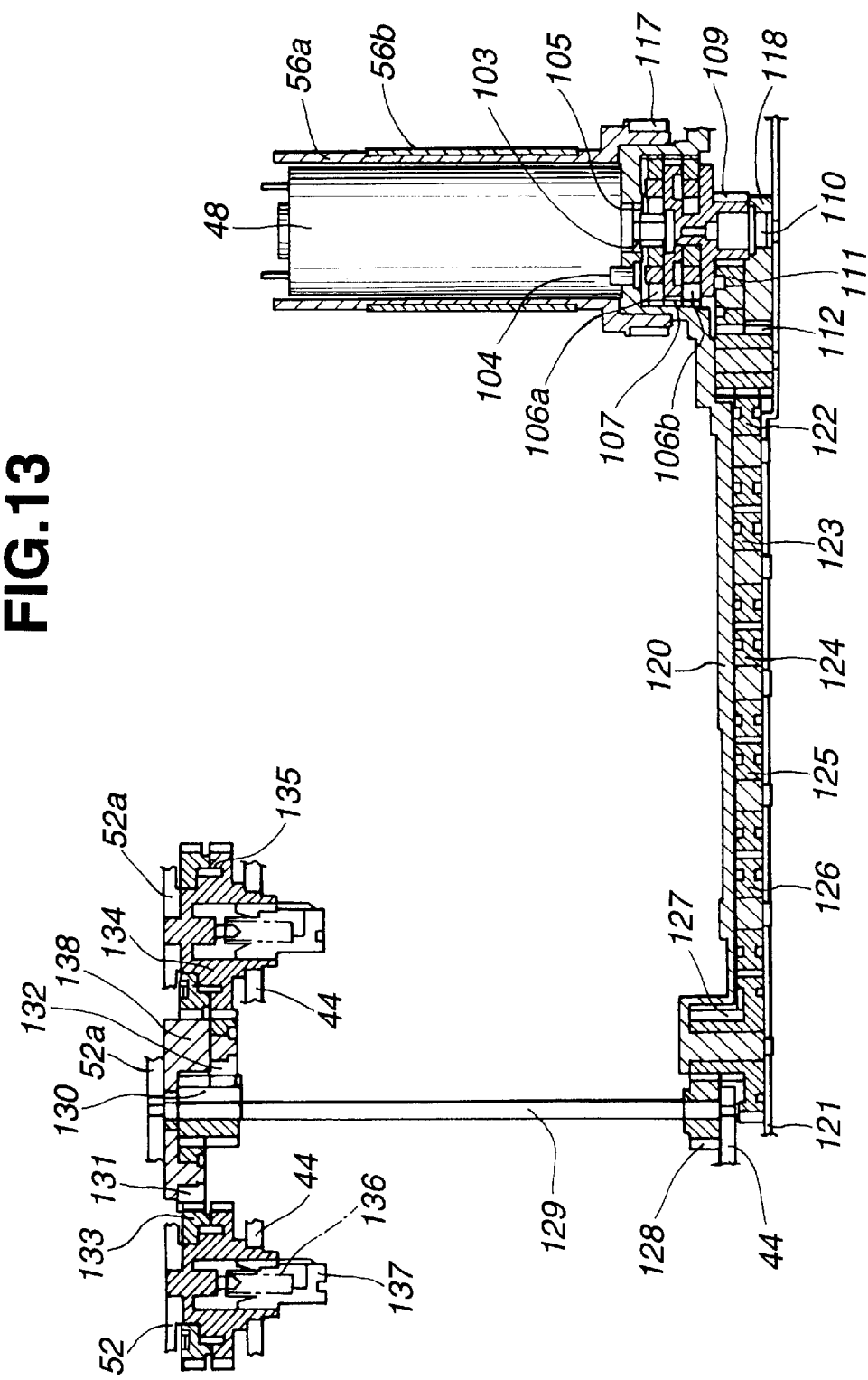
FIG. 13 is a development elevational view showing an engagement condition of a gear train of a film rewinding drive system of the FIG. 1 camera.

Furthermore, in FIG. 13, the development located on the right-hand side with respect to the eighth RW gear 130 shows the state that the tenth RW gear 132 rotatably supported by the other arm portion of the second clutch arm 138 is engaged with a twelfth RW gear 134. This state signifies that the second clutch arm 138 experiences the counterclockwise rotation of the eighth RW gear 130 to revolve in the same direction. Accordingly, the engagement state (the left-hand side development in FIG. 13) between the ninth RW gear 131 and the eleventh RW gear 133 and the engagement state (the right-hand side development in FIG. 13) between the tenth RW gear 132 and the twelfth RW gear 134 do not concurrently occur.

Figure 14:
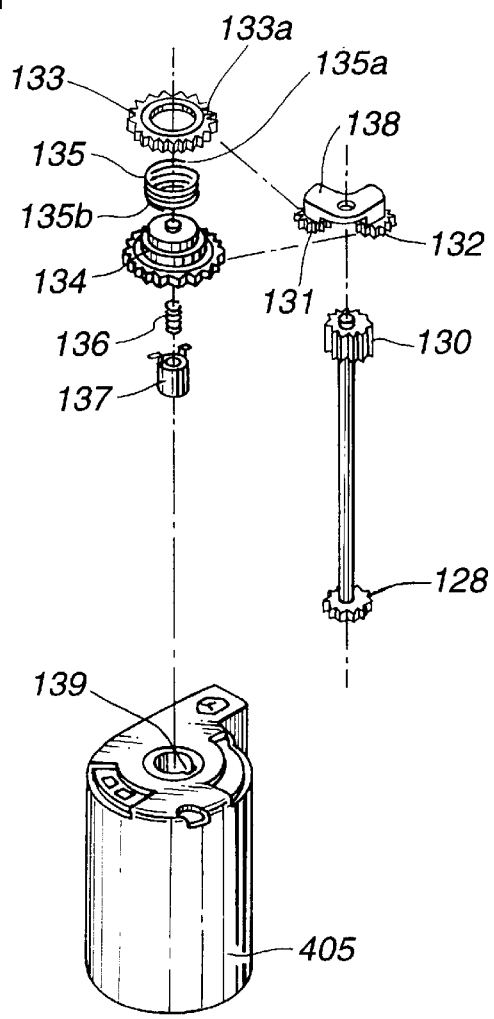
FIG. 14 is an exploded perspective view showing a one-way clutch unit of the FIG. 1 camera and a perspective view schematically showing a cartridge engaging with the unit.

The eleventh and twelfth RW gears 133, 134 compose a one-way clutch mechanism (the above-mentioned one-way clutch unit 52) which in turn, is disposed so that its axis coincides with the axis (the cartridge axis) of a cartridge 405 to be mounted in the cartridge compartment 57 (see FIG. 14).

Referring to FIG. 14, a description will be made of the one-way clutch mechanism. The twelfth RW gear 134 holds an RW claw 137 with a spring biasing force by means of an RW spring 136, while the RW claw 137 is slidable in the axial direction. In this case, the RW claw 137 rotates together with rotation of the twelfth RW gear 134 in the same direction. Further, the RW claw 137 is engaged with an engaging portion 139 provided one end portion of the cartridge shaft within the cartridge 405 mounted in the camera, whereupon the driving force from the film loading motor 48 is transferred to the cartridge shaft of the cartridge 405.

More specifically, as shown in FIG. 14, the RW spring 136 has, for example, a coil-like configuration and opposite end portions thereof are engaged with a projection portion (not shown) formed on the lower surface side of the twelfth RW gear 134 and a recess portion made on the top surface side of the RW claw 137, whereupon it is positioned. Further, the RW claw 137 is built in the twelfth RW gear 134 in a snap-in way.

A portion comprising a cylindrical configuration is provided on a top surface portion of the twelfth RW gear 134 and a one-way spring 135 is disposed at its circumferential portion. This one-way spring 135 has, for example, a coil-like configuration and constitutes the so-called spring clutch arranged to be locked with the twelfth RW gear 134 by winding and tightening. That is, on the eleventh RW gear 133 on the upper side thereof there is provided an engagement portion 133*a* whereby the eleventh RW gear 133 and the one-way spring 135 come into engagement with each other. With the rotation of the eleventh RW gear 133 in the forward and reverse directions, the one-way spring 135 is tightened and loosened.

More specifically, the one-way spring 135 is equipped with a hook portion 135*a* and an end portion 135*b*, and the hook portion 135*a* is engaged with the engagement portion 133*a* of the eleventh RW gear 133. In this state, when the eleventh RW gear 133 rotates clockwise, since the engagement portion 133*a* and the hook portion 135*a* are in engaging relation with each other, the one-way spring 135 is biased in the tightened direction. Further, the end portion 135*b* rotates the twelfth RW gear 134 in the same direction in accordance with the rotation of the eleventh RW gear 133 without slipping with respect to the twelfth RW gear 134.

Furthermore, when the eleventh RW gear 133 rotates counterclockwise, the hook portion 135*a* works in the direction of loosening the one-way spring 135. Accordingly, the end portion 135*b* slips without locking with respect to the twelfth RW gear 134, so that the twelfth RW gear 134 does not rotate.

Although the one-way clutch mechanism is thus constructed, since whether the ninth and tenth RW gears 131, 132 engage with the eleventh or twelfth RW gear 133 or 134 depends upon the rotating direction of the eighth RW gear 130, in the state where the cartridge 405 is mounted in the camera but the film is not fed, the slippage of the one-way spring 135 of the one-way clutch mechanism does not occur. That is, this one-way clutch mechanism is necessary only when in the camera containing the cartridge 405 the film winding operation is made from the initial forwarding operation.

In the one-way clutch mechanism, the thrust-direction restriction relies upon the first body 44 and a one-way clutch base 52*a*. That is, the one-way clutch unit 52 is disposed above the gripping section 1*a* of this camera (see FIG. 7) and is positioned at a given place by the first body 44 and the one-way clutch base 52*a*. Whereupon, the restriction of the second clutch arm 138 and the eighth RW gear 130 in the thrust direction is also possible.

FIG. 11 shows the operation of the auto-loading mechanism, i.e., the state of carrying out the initial forwarding operation and the winding operation of the film. That is, in a manner that the spool gear 117 rotates clockwise, the eleventh RW gear 133 is rotated clockwise through the gear trains of the rewinding drive system and the forwarding drive system, and therefore the RW claw 137 (see FIG. 14) rotates the cartridge shaft in the direction of forwarding the film to perform the film initial forwarding operation, that is, to lead out the film into the film traveling passage and further to the spool shaft (56a) within the spool compartment (56). Further, meanwhile the spool shaft 56a, together with the spool gear 117, continues to rotate clockwise in FIG. 11 and the film initial forwarding operation shifts to the film winding operation from the time that the tip portion of the film forwarded from the interior of the cartridge comes into contact with the spool shaft (56a).

Figure 15:
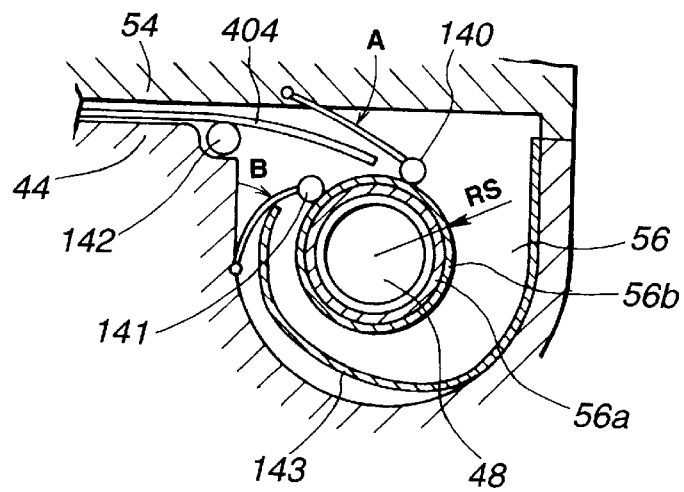
FIG. 15 is a transverse cross-sectional view showing the FIG. 1 camera in the vicinity of spool compartment.

Referring to FIG. 15, a brief description will be made here of a film winding mechanism located in the vicinity of the spool shaft. Incidentally, the film winding mechanism in this camera is a prior common one for a camera or the like using, for example, the 135 type film cartridge, that is, involves a friction winding mechanism based upon a frictional force or the like.

The film loading motor 48 is situated inside the spool shaft 56a provided at one end portion of the first body 44 and rotatably supported at the central portion of the spool compartment 56. In this case, a slight gap is made between the outer circumferential portion of the film loading motor 48 and the inner wall surface of the spool shaft 56a.

A spool rubber 56b constructed employing a thin silicon rubber or the like is placed in the outer circumferential portion of the spool shaft 56a by pressure insertion or the like. Two roller members are brought into contact with the spool rubber 56b by a spring force. That is, a first guide roller 140 being one roller member is biased in a direction indicated by an arrow A by means of a biasing member such as a leaf spring having a supported portion at a fixing member (not shown) on the second body 54 side. Thus, a film 404 forwarded from the cartridge 405 is brought into contact with the outer circumferential surface of the spool shaft 56a and pressed.

Furthermore, a second guide roller 141 being the other roller member is biased in a direction indicated by an arrow B through the use of a biasing member such as a leaf spring having a supported portion at a fixing member (not shown) on the first body 44 side. Accordingly, (due to roller 141) the film 404 comes into contact with the outer circumferential surface of the spool shaft 56a at a portion corresponding to substantially one revolution of the tip portion of the film 404 forwarded from the interior of the cartridge 405 around the outer circumferential surface of the spool shaft 56a, and roller 141 presses the film against rubber lover 56b.

On the inner wall surface of the spool compartment 56 there is disposed a guide sheet 143 whereby the tip portion of the film 404 forwarded from within the cartridge 405 into the spool compartment 56 is led onto the outer circumferential surface of the spool shaft 56a. This guide sheet 143 is, at its support point, fixed to a first body 44 side fixing member (not shown) and is disposed along the inner wall surface of the spool compartment 56 and further along the outer circumferential surface of the spool shaft 56a.

In the film winding mechanism thus constructed in the vicinity of the spool shaft, when the film 404 passes through between the first guide roller 140 and the spool shaft 56a, a frictional force due to the spool rubber 56b causes the film 404 to wind itself around the spool shaft 56a.

Furthermore, since this camera conforms to The Advanced Photo System as described before, it conducts the film initial forwarding operation which is the operation performed until the film 404 reaches the first guide roller 140.

That is, until coming to the state as shown in FIG. 15, the rotation of the eleventh RW gear 133 causes the rotation of the cartridge shaft of the cartridge 405 mounted in the cartridge compartment 57, thus accomplishing the film initial forwarding operation.

Made between the first body 44 and the second body 54 is a separation which is useful for ensuring the optimal flatness of the film 404 in the exposure opening section. At an end portion thereof, i.e., between the film travelling passage and the spool compartment 56, a body roller 142 is rotatably provided on a fixing member (not shown) on the first body 44 side. This body roller 142 reduces the loss due to the friction or the like occurring when the film 404 is delivered into the spool compartment 56, and a detection section (not shown) provided in connection with the body roller 142 detects the rotational speed of the body roller 142, with the detection result being feedback to a control circuit or the like which controls the timings for the magnetic information recording or the like.

Thus, as shown in FIG. 11 the clockwise rotation of the eleventh RW gear 133 develops the rotation of the RW claw 137 to rotate the cartridge shaft within the cartridge 405 in the film initial forwarding direction, thus conducting the film initial forwarding operation.

In this camera, the total reduction ratio iAL of the forwarding drive systems is set to be iAL=263.1. In addition, the film loading motor 48 is constructed using a DC cored motor of $\phi 12$ (mm) and L=30 (mm), which is capable of providing a torque necessary and sufficient for the driving of the cartridge shaft through the reduction drive system.

Furthermore, the total reduction ratio iW of the winding drive system as shown in FIG. 11 is set to iW=135.2. In addition, as shown in FIG. 15, within the spool compartment 56, the radius Rs of the outer circumferential portion of the spool rubber 56b is set to be Rs=7.6 mm.

Since, as described above, the total reduction ratio iAL of the forwarding drive system is set to be sufficiently large as compared with the total reduction ratio iW of the winding drive system, when the film 404 forwarded from the interior of the cartridge 405 is wound around the spool rubber 56b on the spool shaft 56a, the film 404 is taken up by the spool shaft 56a at a speed higher than the shifting speed due to the forwarding drive system. Accordingly, the film 404 is wound around the spool rubber 56b on the spool shaft 56a to be adhered closely thereto, but not wound to inflate.

In the state shown in FIG. 11, when the film (404) is wound around the spool shaft (56a) and comes into the winding state at a higher speed than that by the forwarding drive system, the one-way clutch mechanism composed of the eleventh and twelfth RW gears 133, 134 and others is put into operation. That is, the winding of the film 404 at the speed higher than that in the forwarding drive system signifies that in FIG. 14 the engagement section 139 rotates faster than the eleventh RW gear 133, and the relative relationship between the eleventh and twelfth RW gears 133, 134 is similar to that the eleventh RW gear 133 rotates counterclockwise in FIG. 11 as described above. In this state, the one-way spring 135 works in the loosening direction, and therefore the eleventh and twelfth RW gears 133, 134 are released from the locking condition.

Thus, after the film 404 is wound around the spool shaft 56a, the state of the above-mentioned gear train proceeds to the state shown in FIG. 11, and the eleventh RW gear 133 does not take part in the film forwarding operation and the winding operation occurs in an idle running condition.

Furthermore, referring to FIG. 16 a description will be made hereinbelow of the rewinding drive system of this camera when conducting the film rewinding operation.

Figure 16:
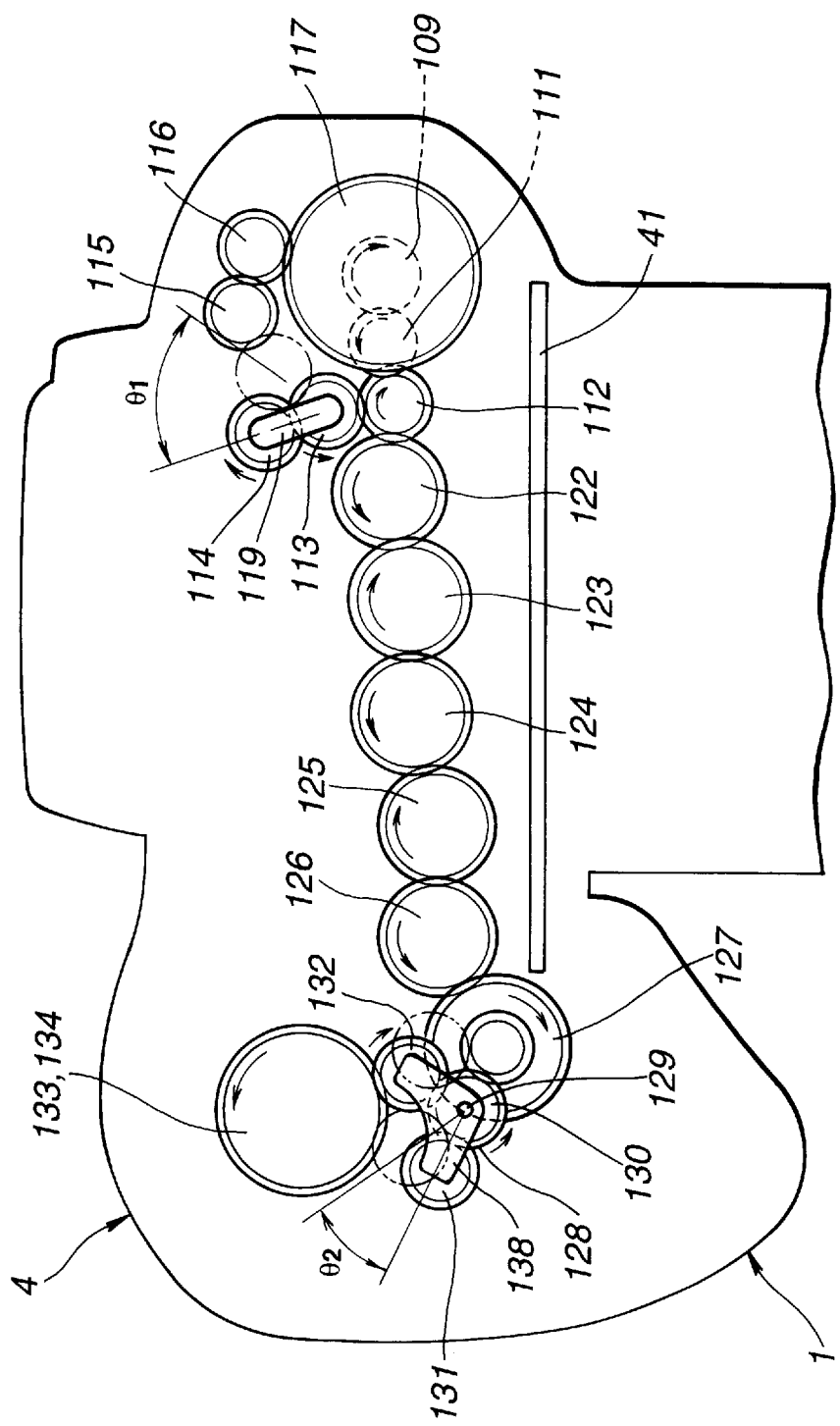
FIG. 16 is a schematic structural illustration of a disposition of a gear train of a film drive system viewed from the top side of the FIG. 1 camera, showing a film rewinding state.

As shown in FIG. 16, at the film rewinding operation the position of the first W gear 111 is the same as that at the winding operation while the rotating direction of the film loading motor 48, i.e., the rotating direction of the second reduction gear 109, differs therefrom.

More specifically, when the second reduction gear 109 rotates clockwise, the respective gears organizing the above-mentioned rewinding drive system rotate in the directions indicated by the arrows shown in FIG. 16.

As described above, the fourth W gear 114 is rotatably supported at one arm portion of the first clutch arm 119 and a friction is given through the wave washer (not shown) or the like. In addition, the third W gear 113 is rotatably supported at the other arm portion of the first clutch arm 119 and the third W gear 113 and the first clutch arm 119 are coaxially and rotatably supported and positioned within the first motor base 120.

In the case of the film winding operation, when the film loading motor 48 (the aforesaid second reduction gear 109) rotates counterclockwise (referred to as rotation in a second direction) in FIG. 11, the first clutch arm 119 is fixed at a given position through a stopper member (not shown) or the like in the state as shown in FIG. 11, and at this position the fourth W gear 114 and the fifth W gear 115 are maintained in the engaging condition.

On the other hand, in the case of the film rewinding operation, when in FIG. 16 the film loading motor 48 (the second reduction gear 109) rotates clockwise (referred to as rotation in a first direction), the first clutch arm 119 revolves by an angle θ1 counterclockwise about its support shaft and is fixed at this position, i.e., at a given position by a stopper member (not shown). At this position, the fourth W gear 114 and the fifth W gear 115 are released from an engaging condition. Accordingly, of the gears constituting the gear train of the winding drive system, the respective gears from the fifth W gear 115 to the spool gear 117 move to a non-operated condition.

Still further, in the case of the film rewinding operation, the rotating direction of the eighth RW gear 130 of the rewinding drive system is the opposite to the rotating direction at the winding. That is, when the film loading motor 48 (the second reduction gear 109) rotates clockwise (the rotation in the first direction) in FIG. 16, the eighth RW gear 130 rotates counterclockwise in FIG. 16, and accordingly the second clutch arm 138 also revolves counterclockwise in FIG. 16. In addition, when rotating by an angle θ2, the second clutch arm 138 is positioned at that position by a stopper member (not shown) and further the tenth RW gear 132 comes into engagement with the twelfth RW gear 134. Whereupon the driving force of the film loading motor 48 is transferred to the rewinding drive system and the transfer of the driving force is released within the forwarding drive system.

Incidentally, the state at this time is the state developed on the right-hand side with respect to the eighth RW gear 130 in FIG. 13. In this case, since the tenth RW gear 132 is in engagement with the twelfth RW gear 134, the driving force of the eighth RW gear 130 is directly transferred to the twelfth RW gear 134 without the use of the one-way clutch mechanism.

Furthermore, the contents of the eleventh and twelfth gears 133, 134 are the same in the forwarding drive system and in the rewinding drive system, and hence the total reduction ratio iRW of the rewinding drive system is set to iRW=263.1 which is the same as that of the total reduction ratio iAL of the forwarding drive system.

As described above, in the camera according to the above-described first embodiment, only in the manner that the rotation of a single motor, i.e., the film loading motor 48, is switched between the forward and reverse directions, the switching of the drive systems becomes easy for the film initial forwarding operation, the winding operation and the rewinding operation.

On the roll film adopted for The Advanced Photo System using this camera, the magnetic information recording area or the like is defined on its film surface as described before, and hence it is possible to magnetically make an information recording of the photography information. In this case, in terms of the information recording timing, for example the recording is made in the recording area of the photographing frame in link with the film winding operation by one frame after the shutter release operation at photography.

In this instance, the photography information or the like includes the information on date, the information on comments such as message to the photographing frame, the information on the designation of the number of times of print at the picture printing processing, and others, and in the case that at the actual photography the photography result shows that the picture in the photographing frame does not satisfy the image the photographer has, for example in the case that it was clear that his eyes were closed at the photographing while being on a journey, it is considered that the necessity of changing the information on the designation of the number of times of print or the like will occur.

Thus, in this camera, in such a situation it is possible to arbitrarily change the information recording made with regard to the last one photographing frame immediately after the photography, that is, to rewrite the recorded information or the like for only that one frame.

More specifically, this camera is provided with a mechanism having a control circuit or the like which controls the systems to conduct the rewinding operation corresponding to one frame after performing the rewinding operation by one frame through a given operation and to change the recorded information or the like at the one frame winding operation. This information changing operation will hereinafter be referred to as rewrite operation, and will be described hereinbelow.

In the case of conducting the rewrite operation, the rewinding operation is first done by one frame. Accordingly, the drive systems in the camera shift from the winding operation condition (the state shown in FIG. 11) to the rewinding operation condition (the state shown in FIG. 16).

In the ordinary case, the switching from the winding drive system to the rewinding drive system is made, for example at the rewinding operation after the completion of the photography of the final frame of the film and the rewinding operation resulting from the rewinding setting by a halfway rewinding button (27) or the like before the use-up of the film, and in any case the film is rewound until being completely housed within the cartridge. Further, after the film including its tip portion is fully accommodated within the cartridge, a data disk placed within the cartridge and indicating the use status of the film housed in the cartridge, for example "exposed film (unprocessed)", "processed film", "partially exposed film" and "unexposed film" is set at a given position corresponding to the "exposed film (unprocessed)", thereafter terminating a series of operations. In this case, the film rewinding operation and the positioning operation of the cartridge side data disk take the same rotating direction, and therefore the state of the drive system at the time of completion of this series of operations results in the state shown in FIG. 16.

On the other hand, when performing the rewrite operation, the film rewinding operation is done by one frame, and the film loading motor 48 rotates in the reverse direction so that the gear trains organizing the drive systems rotate in the opposite direction and the first and second clutch arms 119, 138 revolve in given directions, thus getting into the rewinding state shown in FIG. 16.

In the ordinary case, the roll film wound around the cartridge shaft and housed within the cartridge is in a loosely rolled condition. Accordingly, when the camera takes the film rewinding state, this film changes from the loosely wound condition to the tightly wound condition within the cartridge, and subsequently comes into movement by one frame. Such a situation similarly arises even in the case of rewinding the film halfway.

After the film starts to move in its rewinding direction, the detection mechanism (not shown) detects the rewound amount corresponding to one frame, and the film loading motor 48 undergoes control to stop. In this state, the new magnetic information or the like to be rewritten is already set, and the control circuit (not shown) of the camera immediately rotates the film loading motor 48 in the winding direction.

At this time, the rotating directions of the respective gears of the gear train constituting the above-mentioned drive system and the positions of the first and second clutch arms 119, 138 again return as shown in FIG. 11 to set the condition for the ordinary film winding operation. Simultaneously with this, the ordinary control is executed to carry out the one frame winding, and the newly set magnetic information or the like is rewritten in the magnetic information recording area on the film surface.

After the completion of the one frame rewinding operation and the new information recording operation, the film loading motor 48 stops. Accordingly, the state of the drive system after the rewrite operation completely becomes the same as the state immediately after the one frame winding operation subsequent to the ordinary photography.

There is a difference in the state of the gear trains of the drive systems between the case of performing the rewrite operation and the case of conducting the ordinary film winding operation.

That is, in the case of performing the rewrite operation, the RW claw 137 and the spool shaft 56a are maintained in a connecting state through the film at the revolution of the two clutch arms (the first clutch arm 119 and the second clutch arm 138) in the winding directions.

More specifically, in the state (FIG. 16) during the film rewinding operation and after the completion of the rewinding, in the gear train of the rewinding drive system, the eighth RW gear 130, the tenth RW gear 132, the twelfth RW gear 134 and the RW claw 137 are in the state to directly transfer the driving force from the film loading motor 48 side without interposing the above-mentioned one-way clutch mechanism.

In this state, when the driving force is applied in the direction of drawing out the film from the interior of the cartridge, the second clutch arm 138 is pressed in the direction of further strengthening the engagement, with the result that the gear train of this drive system comes into the locked condition.

That is, the above-mentioned two clutch arms (first and second clutch arms 119, 138) involve a problem in switching timing, that is, it is necessary that the timing at which the fourth W gear 114 and the fifth W gear 115 start to engage through the revolution of the first clutch arm 119 is set after the release of the engagement between the tenth RW gear 132 and the twelfth RW gear 134 by the revolution of the second clutch arm 138. Further, if the timing setting is wrong, the film is simultaneously pulled from both the cartridge side and spool shaft side (locked state), with the result that difficulty is encountered to perform the winding operation.

Accordingly, important factors to respectively determine the switching timings of the two clutch arms (the first and second clutch arms 119, 138) are the revolution angles $\theta 1$, $\theta 2$ (see FIG. 16) of the two clutch arms (the first and second clutch arms 119, 138) and the reduction ratios of the winding drive system and the rewinding drive system, i.e., the reduction ratios from the film loading motor 48 to both the clutch arms 119, 138.

In terms of the reduction ratios from the film loading motor 48 to both the clutch arms 119, 138, the gear train from the film loading motor 48 to the second W gear 112 is common, and hence the difference in rotating amount becomes clear by the comparison between the second W gear 112 and the gears of both the clutch arms 119, 138.

Figure 17:
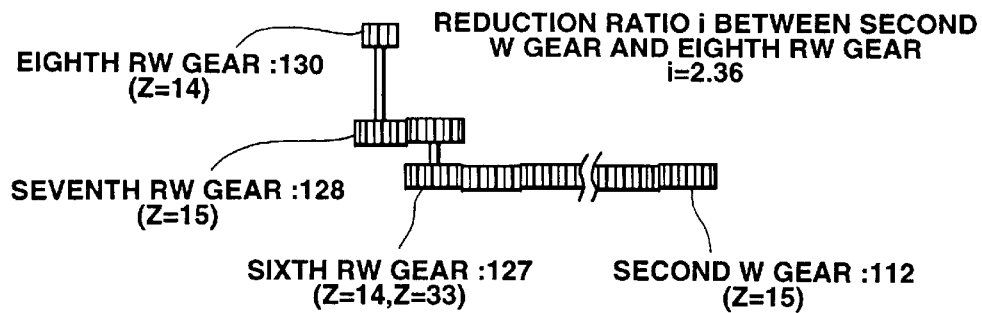
FIG. 17 briefly shows a gear train of a film rewinding drive system of the FIG. 1 camera.

Moreover, all the gears of the gear train of the winding drive system between the second W gear 112 and the third and fourth W gears 113, 114 of the first clutch arm 119 are idling gears, and therefore only the gear train of the rewinding drive system is illustrated in FIG. 17.

Of the gear train of the rewinding drive system, in the gear train from the second W gear 112 to the eighth RW gear 130 being the sun gear of the second clutch arm 138, the sixth RW gear 127 is constructed as a two-stage gear, while the seventh and eighth RW gears 128, 130 also serve as a two-stage gear by the connection through the RW shaft 129.

In the sixth RW gear 127, the number Z of teeth of the large gear=33 and the number Z of teeth of the small gear=14, while in the case of the seventh and eighth RW gears 128, 130, the number Z of teeth of the seventh RW gear 128 being the large gear=15 and the number Z of teeth of the eighth RW gear 130 being the small gear=14.

Thus, in terms of the rotating amount of the second W gear 112, in the case of going toward the first clutch arm 119 side, i.e., the winding drive system gear train side, since as mentioned above the gears from the second W gear 112 to the third and four W gears 113, 114 are the idle gears, the transfer is made at 1:1. On the other hand, in the case of going toward the second clutch arm 138 side, $$(15/33) \times (14/15) = 1/2.36$$

That is, the transfer is made at 1:1/2.36. More specifically, the reduction ratio i between the second W gear 112 and the eighth RW gear 130=2.36.

Figure 18:
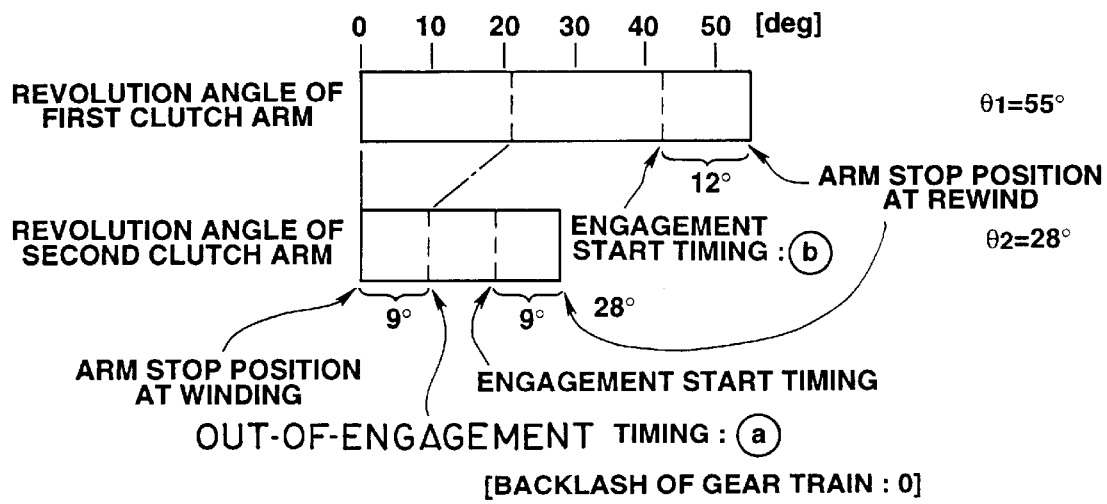
FIG. 18 is a timing chart useful for describing moving states of a first clutch arm and a second clutch arm of the FIG. 1 camera in the case in which the backlash of the gear train=0.

The movement states of the first clutch arm 119 and the second clutch arm 138 are shown in FIG. 18.

FIG. 18 is a timing chart where its horizontal axis indicates the respective revolution angles of the first and second clutch arm 119, 138. In FIG. 18, a reference position indicated with 0 [deg.] signifies the case that the first and second clutch arms 119, 138 reside at the positions indicated with solid lines in FIG. 16, that is, the state at the film rewinding.

When the film loading motor 48 rotates in the reverse direction from this state, the first and second clutch arms 119, 138 start to revolve.

In FIG. 18, for simplifying the description thereof, the backlash on each of the gears of the gear train constituting the drive system is taken to be zero.

As shown in FIG. 18, the revolution angle $\theta 1$ of the first clutch arm 119 in the film rewinding state shown in FIG. 16 is set to $\theta 1 = 55$ [deg.], while the revolution angle $\theta 2$ of the second clutch arm 138 is set to $\theta 2 = 28$ [deg.]. In addition, the engagement between the fourth W gear 114 being a planetary gear of the first clutch arm 119 and the fifth W gear 115 is made within the range of the revolution angle $\theta 1$ and within the range of 12 [deg.].

On the other hand, the engagement between the tenth RW gear 132 being one planetary gear of the second clutch arm 138 and the twelfth RW gear 134 is made within the range of the revolution angle $\theta 2$ and within the range of 9 [deg.].

Within the range of the revolution angle θ2, the engagement of the ninth RW gear 131 being the other planetary gear of the second clutch arm 138 and the eleventh RW gear 133 is made within the range of 9 [deg.] in a similar way.

In this instance, for surely completing the rewrite operation without occurrence of the locked state as mentioned above, the point (a) being the timing of the release of the engagement between the ninth and eleventh RW gears 131, 133 due to the second clutch arm 138 is required to be set sufficiently prior to the point (b) being the timing of the start of the engagement between the fourth and fifth W gears 114, 115 due to the first clutch arm 119.

Since in FIG. 18 as described above the backlash of each of the gears of the gear train of the drive system is assumed to be zero, it is expected that no looseness occurs in the gear train. Accordingly, when the second W gear 112 starts to rotate in the reverse direction by the reverse rotation of the film loading motor 48, its driving force is transferred through the respective gear trains to the first and second clutch arms 119, 138 which in turn, concurrently start to revolve.

As described above, the engagement range between the ninth and eleventh RW gears 131, 133 due to the second clutch arm 138 is from the revolution start of the second clutch arm 138 (the start of the reverse rotation of the second W gear 112) to 9 [deg.]. In this case, since the reduction ratio i between the second W gear 112 and the eighth RW gear 130=2.36, when the second clutch arm 138 rotates up to the engagement releasing position (a), the first clutch arm 119 rotates by the following amount.

$$9[\text{deg.}] \times 2.36 = 21.24[\text{deg.}]$$

The range of the engagement between the fourth and fifth W gears 114, 115 owing to the revolution of first clutch 119 is 12 [deg.], i.e., after the engagement start point (b), and hence $$55 - 21.24 - 12 = 21.76[\text{deg.}]$$

In this case, the range of approximately 21 [deg.] can be considered as a margin.

Figure 19:
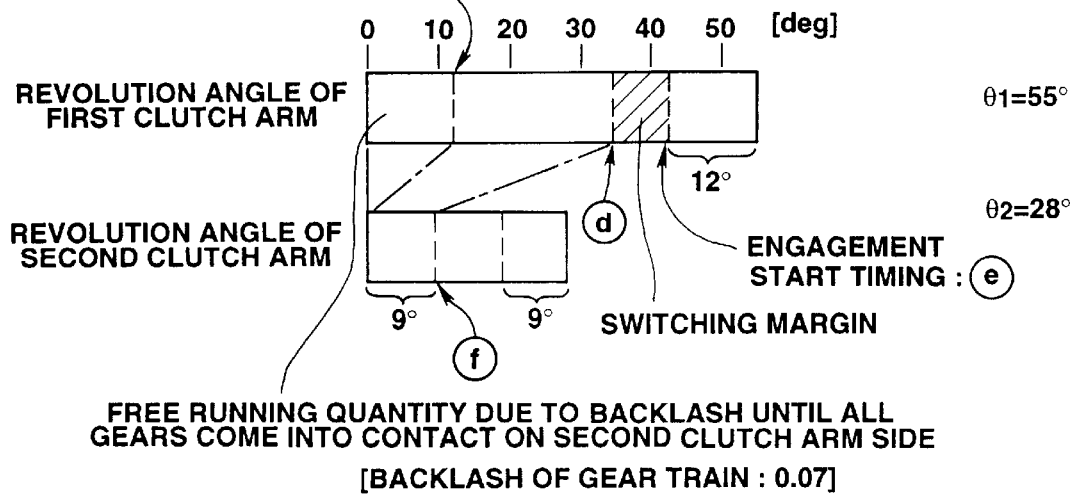
FIG. 19 is a timing chart useful for describing moving states of the first clutch arm and the second clutch arm of the FIG. 1 camera in the case in which the backlash of the gear train=0.07.

In the actual gear train, a backlash=0 does not occur. Thus, in this camera, considering that a gear with, for example, a module of 0.4 is applied to each of the gears organizing the gear train of the drive system, the average value of the backlashes is taken as the backlash in the normal direction= 0.07. FIG. 19 is a timing chart in this state.

First, as shown in FIG. 16, since the difference between the number of gears from the second W gear 112 to the third W gear 113 (the gear train comprising two gears: the winding drive system) and the number of gears from the second W gear 112 to the eighth W gear 130 (the gear train comprising 8 gears: the rewinding drive system) is 6, judging from the idle running quantity taken until all the gears of the respective gear trains come into contact due to the total backlash taking into consideration the looseness among the gears at the reverse rotation of the film loading motor 48, both the clutch arms 119, 138 start to revolve when the first clutch arm 119 makes the idle running by 11.9 [deg.] with respect to the second clutch arm 138 (the position indicated by a point (c) in FIG. 19).

The first clutch arm 119 rotates by 21.24 [deg.] as well as the case shown in FIG. 18 until the start point (f) of the release of the engagement between the ninth and eleventh RW gears 131, 133 due to the second clutch arm 138, and hence, when the second clutch arm 138 stands at a point (f), the first clutch arm 119 resides at a point (d).

A start point (e) of the engagement between the fourth and fifth W gears 114, 115 due to the first clutch arm 119 is the same as that in FIG. 18.

Accordingly, the range of approximately 8 [deg.] between the point (d) and the point (e) (the portion indicated by oblique lines in FIG. 19) is the switching margin. In this case, taking into consideration the difference among the gears constituting each gear train and the variation in dimension, when these are accumulated, there is a possibility that the relationship between the point (d) and the point (e) changes, and in this case the switching operation is not completed.

For this reason, in the disposition of the gear trains of the respective drive system in the camera according to the first embodiment (see FIG. 16), the revolution angle θ1 of the first clutch arm 119=55 [deg.], it is found that, for satisfying the switching operation for releasing the transfer of the driving force to the winding drive system, the extreme accuracy of the system against the backlash and others is necessary.

Thus, a description will be made hereinbelow of a second embodiment which is capable of surely performing the switching operation for the release of the transfer of the driving force to the winding drive system even if the average value of the backlashes of the respective gears constituting each gear train of the drive system is 0.07 in level.

Figure 20:
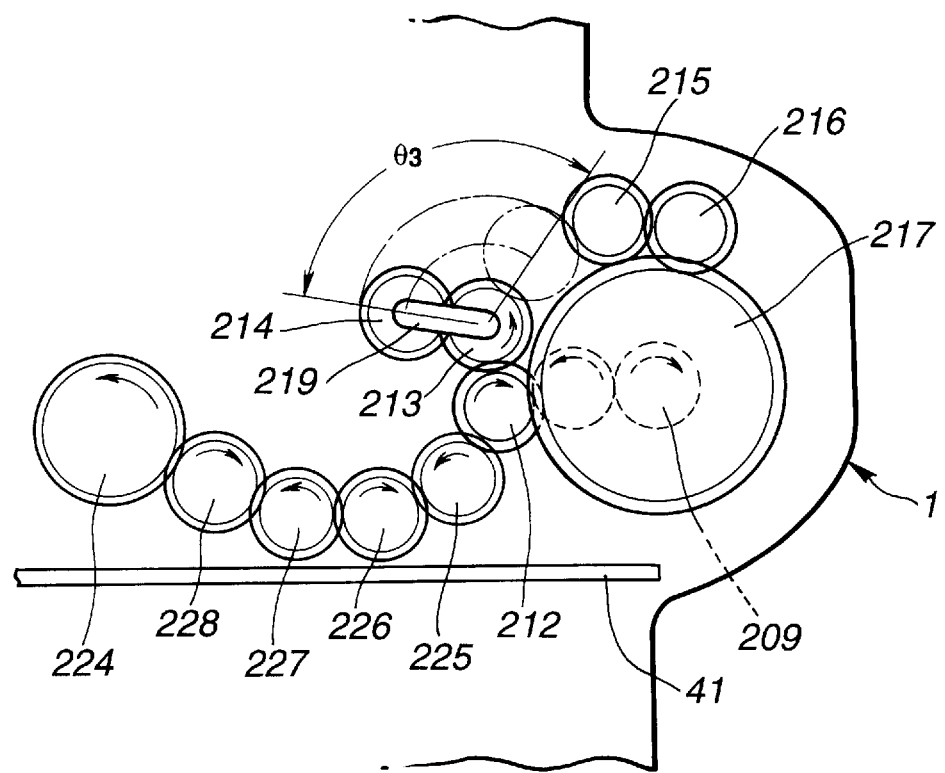
FIG. 20 is an illustration of a principal portion on a disposition of gear trains of drive systems in the vicinity of a first clutch arm in a camera according to a second embodiment of the present invention, showing a film rewinding state.

FIG. 20 is a schematic illustration of a principal section, showing a disposition of gear trains of drive systems in the vicinity of a first clutch arm in a camera according to a second embodiment of the present invention, which takes its rewinding state.

As well as the above-described first embodiment (see FIGS. 11 and 16), a gear train constituting a winding drive system in this camera comprises a second W gear 212, a third W gear 213, a fourth W gear 214, a fifth W gear 215, a sixth W gear 216 and others. The third W gear 213 and the fourth W gear 214 being a first planetary gear are rotatably supported by a first clutch arm 219 and engaged with each other, and a friction engagement is provided through a wave washer (not shown) or the like to each of them, thus organizing a first planetary clutch mechanism.

In addition, a gear train composing a rewinding drive system and a forwarding drive system is, as shown in FIG. 20, made up of the second W gear 212, an eleventh RW gear 225, a twelfth RW gear 226, a twenty-first 227, a twenty-second RW gear 228, a third RW gear 224 and others.

In FIG. 20, of the gear train rewinding drive rewinding drive system, the gear engaged with the third RW gear 224 and the following gears are the same as those shown in FIGS. 11 and 16, and hence the illustration thereof is omitted therefrom.

FIG. 20 shows a disposition of each gear train in this camera in the case of the revolution angle θ3 of the first clutch arm 219=90 [deg.]. In this instance, a second reduction gear 209 to the second W gear 212 are the same as the second reduction gear 109 to the second W gear 112 (see FIGS. 11 and 16) in the first embodiment.

In this second embodiment, the revolution angle θ3 of the first clutch arm 219 is compared with the revolution angle θ1 of the first clutch arm 119 (FIG. 16) and that range is set to be enlarged, and therefore a dead space is enlarged in order not to interfere with the arm 219. For this reason, difficulty is encountered to adopt the idle gears of the rewinding drive system similar to the gear trains of the drive systems in the first embodiment (see FIG. 16).

In this case, the second W gear 212, the eleventh RW gear 225, the twelfth RW gear 226, the twenty-first RW gear 227, the twenty-second RW gear 228 and the third RW gear 224 are successively engaged with each other. That is, as compared with the case shown in FIG. 16, the gear train of the rewinding drive system (forwarding drive system) additionally has two gears. The third RW gear 224 is approximately similar to the third RW gear 124 (FIG. 16), whereas the other gears respectively differ therefrom.

Figure 21:
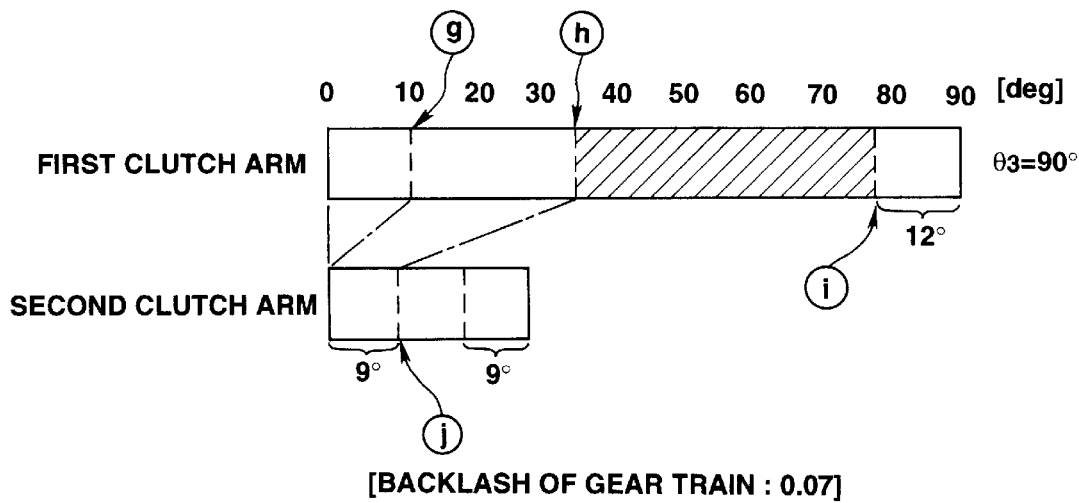
FIG. 21 is a timing chart useful for describing moving states of the first clutch arm and a second clutch arm of the FIG. 20 camera in the case in which the backlash of the gear train=0.07.

Furthermore, FIG. 21 is a timing chart showing the moving states of the first clutch arm and the second clutch arm in the second embodiment. In FIG. 21, as in the case of the above-described first embodiment (see FIG. 19), let it be assumed that the average value of the backlash of the gears organizing the gear trains of the drive systems is 0.07. In this instance, the idle running quantity due to the backlash (0.07) of the respective gears of the first clutch arm 219 is 11.9 [deg.] (the point (c) in FIG. 19) as well as the case shown in FIG. 19, and therefore in the second embodiment the position at which the first clutch arm 219 and the second clutch arm (not shown in FIG. 20) start to revolve, that is, the point at which the idle running of the first clutch arm 219 comes to an end, assumes a point (g) shown in FIG. 21.

Still further, in the second embodiment, the first clutch arm 219 rotates by 21.24 [deg.] as in the case of the first embodiment (see FIG. 19) till an engagement release start point (j) due to the second clutch arm, and when the second clutch arm is at the engagement release point (j), the first clutch arm 219 is at a point (h).

On the other hand, the engagement range between the fourth W gear 214 and the fifth W gear 215 constituting the gear train of the winding drive system within the range of the revolution angle θ3 of the first clutch arm 219=90 [deg.] is 12 [deg.] and is the same as in FIG. 19, and hence in FIG. 21 a switching margin is made between the point (h) being the position of the first clutch arm 219 and an engagement start point (i) between the fourth and fifth W gears 214, 215 due to the first clutch arm 219 (the portion indicated by oblique lines in FIG. 21). That is, the switching margin is approximately 40 [deg.].

Moreover, although in FIG. 21 the average value of backlash is considered as being 0.07, referring to the timing chart of FIG. 22 a description will be taken hereinbelow of the state taken in the case of backlash=0.13 taking into consideration the difference among the respective gears and assuming the maximum difference.

Figure 22:
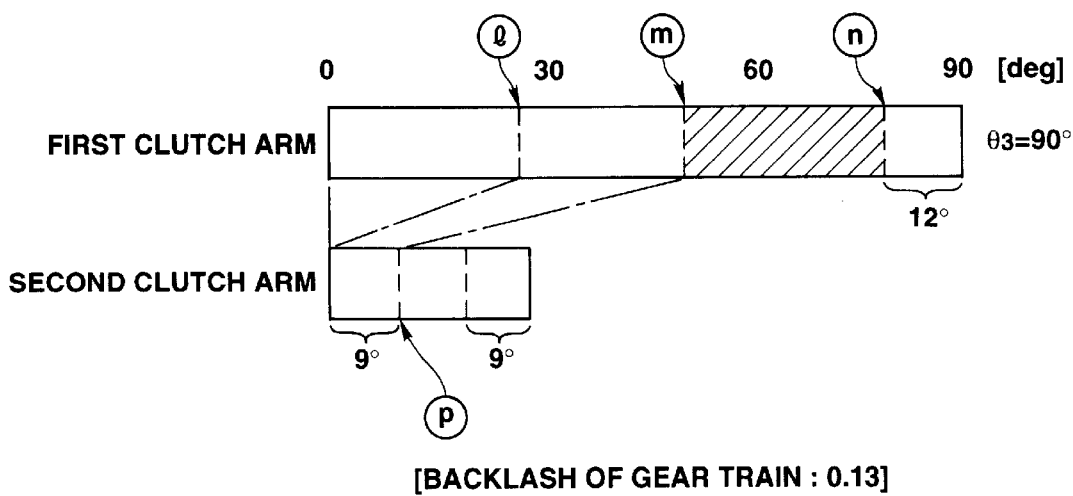
FIG. 22 is a timing chart useful for describing moving states of the first clutch arm and a second clutch arm of the FIG. 20 camera in the case in which the backlash of the gear train=1.13.

As shown in FIG. 22, in the case of the backlash being 0.13, as compared with the case (the backlash=0.07) shown in FIG. 21, the idle running of the first clutch arm 219 increases, and both the position at the first clutch arm 219 and second clutch arm start to revolve, that is, the idle running end position of the first clutch arm 219, assumes a point (l) in FIG. 22.

Furthermore, since the first clutch 219 rotates by 21.24 [deg.] as well as the case shown in FIG. 19 or 21 up to a point (p) of engagement release start due to the second clutch arm, when the second arm is at the engagement release point (p), in FIG. 22 the first clutch arm 219 is at a point (m) that it reaches when rotating by approximately 50 [deg.].

Also in this case, the engagement range between the fourth and fifth W gears 214, 215 due to the first clutch arm 219 is the same as that in FIG. 19 or 21, and hence in FIG. 22 a switching margin is made between a point (m) being the position of the first clutch 219 corresponding to the engagement release point (p) of the second clutch arm and an engagement start point (n) between the fourth and fifth W gears 214, 215 due to the first clutch arm 219 (the portion indicated by oblique lines in FIG. 22), thus attaining the switching margin of approximately 28 [deg.].

Thus, according to the second embodiment, even in the case of the backlash=0.13 taking into consideration the difference among the backlash of the respective gears and assuming the maximum difference, the device of the disposition of the gear train as shown in FIG. 20 allows the revolution angle θ3 of the first clutch arm 219 to be set to approximately 90 [deg.], whereupon the switching margin for the second clutch arm is obtainable by approximately 28 [deg.]. Accordingly, it is possible to certainly conduct the switching operation of the respective drive systems within the camera when performing the rewrite operation or the like.

The disposition of the gear trains of the drive systems according to the second embodiment can create the following problems. That is, (1) Since it is necessary that the revolution angle θ3 (approximately 90 [deg.] in FIG. 20) of the first clutch arm 219 is made to be large, the dead space enlarges within the camera and the severe restriction on the layout of the gear train organizing the rewinding drive system (and the forwarding drive system) becomes necessary and the number of parts used increases (for example, as mentioned above, the number of gears increases by 2); and (2) In the cameras according to the first and second embodiments as described above, the AF sensor unit 51 is disposed below the mirror box 43 (see FIG. 7), and the disposed position of the AF sensor unit 51 is fixed with respect to the mirror box 43 from a functional point of view and it is difficult to change the position thereof.

When the revolution angle θ3 of the first clutch arm 219 is enlarged as in the case of the second embodiment (FIG. 20), the moving range of the fourth W gear 214 in the interior of the camera becomes wide, so that the fourth W gear 214 may interfere with the AF sensor unit 51.

Thus, for ensuring the dead space enlarging by the revolution of the first clutch arm 219, it is necessary to increase the outside transverse dimension of the camera itself, thereby resulting in an increase in size of the camera.

A description will be taken hereinbelow of a third embodiment which can eliminate the above-mentioned problems (1) and (2).

Figure 23:
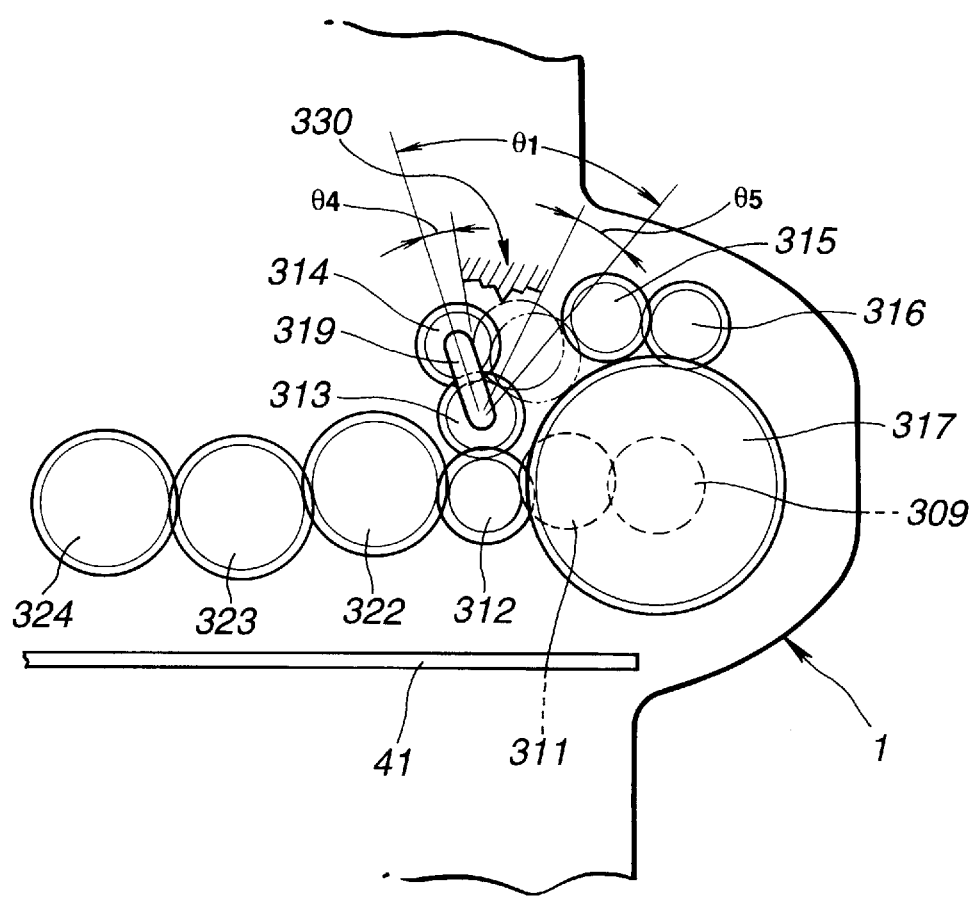
FIG. 23 is an illustration of a principal portion on a disposition of gear trains of drive systems in the vicinity of a first clutch arm in a camera according to a third embodiment of the present invention, showing a film rewinding state.

FIG. 23 is a schematic illustration of a principal section, showing the disposition of gear trains of drive systems in the vicinity of a first clutch arm in a camera according to a third embodiment of the present invention, which takes a rewinding state.

A shown in FIG. 23, as well as the first embodiment (see FIGS. 11 and 16) the gear train constituting the winding drive system is composed of a second W gear 312, a third W gear 313, a fourth W gear 314, a fifth W gear 315, a sixth W gear 316 and others, and the third W gear 313 and the fourth W gear 314 being a first planetary gear are rotatably supported by a first clutch arm 319 and engaged with each other, and a friction engagement is provided through a wave washer (not shown) or the like to each of them, thus organizing a first planetary clutch mechanism.

Furthermore, the gear train constituting the rewinding drive system and the forwarding drive system is made up of the second W gear 312, a first RW gear 322, a second RW gear 323, a third RW gear 324 and others. In FIG. 23, of the gear train composing the rewinding drive system, the gear engaged with the third RW gear 324 and the following gears are the same as those in the above-described first embodiment, and hence illustration thereof is omitted for brevity.

In this third embodiment, the revolution angle θ1 of the first clutch arm 319 is set to θ1=55 [deg.] as well as in the first embodiment. In this instance, a second reduction gear 309 to the second W gear 312 are the same as the second reduction gear 109 to the second W gear 112 (see FIGS. 11 and 16) in the first embodiment.

The first RW gear 322, the second RW gear 323, the third RW gear 324 and others, which compose the gear train of the rewinding drive system, are disposed in a layout similar to that of the first embodiment.

In the intermediate portion of the range of the revolution of the fourth W gear 314 which is rotatably supported at one end portion of the first clutch arm 319 and which is a first planetary gear, there is disposed a differential internal tooth member 330 serving as a differential reduction mechanism (a differential reduction section) which achieves the differential reduction of the first planetary gear (the fourth W gear 314). This differential internal tooth member 330 substantially coincides with the tooth configuration of an internal gear of, for example, the module=0.4 and the number of teeth=47, where only one tooth (one claw) is disposed to engage with the fourth W gear 314.

Since as mentioned above the friction is given by a wave washer or the like to the fourth W gear 314, in the ordinary case, the first clutch arm 319 can carry out only the revolving movement, and after the engagement between the fourth gear 314 and the differential internal tooth member 330, the fourth W gear 314 acts as a planetary gear on the first clutch arm 319 to make the first clutch arm 319 take the differential action.

The third W gear 313 has teeth whose number Z is 15, the fourth W gear 314 has teeth whose number Z is 15, and the differential tooth member 330 corresponds to the number of teeth Z=47 as mentioned above, and therefore the first clutch arm 319 is reduced and revolved as follows with respect to the ordinary revolution condition. That is, the reduction ratio i is set to 1:4.1.

$$((47+15)/15)=4.1$$

Furthermore, in FIG. 23, the state of the first clutch arm 319 indicated by a solid line is that at the rewinding the first clutch arm 319 comes into contact with a stopper member (not shown) or the like to restrict its revolving movement. When in this state the first clutch arm 319 revolves toward the winding drive system side, the angular range where the fourth W gear 314 and the differential internal tooth member 330 start to engage is indicated at θ4. The angular range of the engagement between the fourth W gear 314 and the fifth W gear 315 from this state is designated at θ5.

Figure 24:
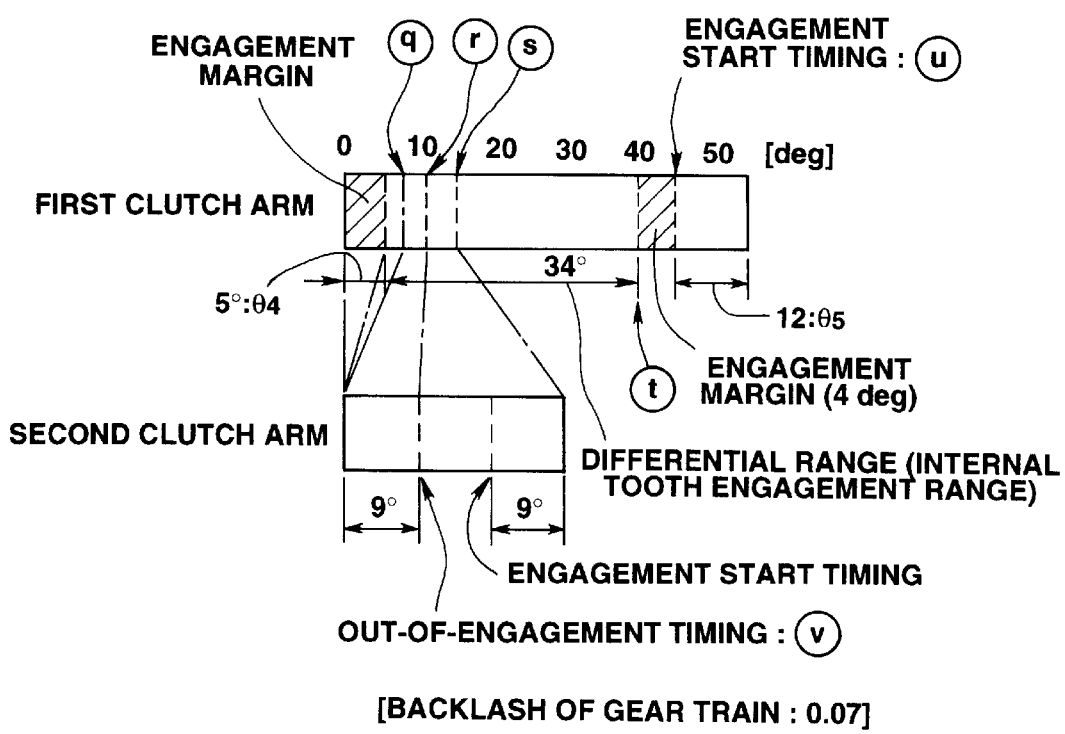
FIG. 24 is a timing chart useful for describing moving states of the first clutch arm and a second clutch arm of the FIG. 23 camera in the case in which the backlash of the gear train=0.07.

FIG. 24 is a timing chart showing the moving states of the first clutch arm 319 and a second clutch arm (not shown in FIG. 23, see FIGS. 11 and 16) in the third embodiment.

As described above the revolution angle of the first clutch arm 319 is set to θ1=55 [deg.], and within this revolution angle θ1, the range of the engagement between the differential internal tooth member 330 and the fourth W gear 314 is 34 [deg.], and within this range the first clutch arm 319 is reduced at the reduction ratio i=4.1 and revolved.

Furthermore, within the range θ5 of the engagement between the fourth W gear 314 and the fifth W gear 315 is set to θ5=12 [deg.]. Further, the angular range θ4 until the fourth W gear 314 and the differential internal tooth member 330 start to engage after the first clutch arm 319 starts to revolve at the rewinding state position is set to θ4=5 [deg.].

Accordingly, in FIG. 24, within the revolution angle θ1=55 [deg.] of the first clutch arm 319, an engagement margin is made between a point (t) being the end position of the aforesaid differential range (34 [deg.]) and a point (u) being the position at which the fourth W gear 314 and the fifth W gear 315 start to engage (the portion indicated by oblique lines in FIG. 24) and set to be 4 [deg.].

In the case that the backlash average value is 0.07, as in the case of the second embodiment (see FIGS. 19 and 21) the idle running amount of the first clutch arm 319 becomes 11.9 [deg.]. In this case, as shown in FIG. 24 the first clutch arm 319 revolves as in the case shown in FIG. 19 within the angular range θ4=5 [deg.] until the W gear 314 and the differential internal tooth member 330 start to engage, and the first clutch arm 319 rotates by an angle of θ4, and when the fourth W gear 314 and the differential internal tooth member 330 start to engage, the reduction ratio i take i=4.1 in the differential range, and hence the following revolution amount of the first clutch arm 319 is $$((11.9-5)/4.1)=1.7[deg.]$$

Accordingly, when the first clutch arm 319 revolves by the following amount, the looseness of the backlash=0.07 is eliminated.

$$5+1.7=6.7[deg.]$$

That is, after the idle running of the first clutch arm 319 occurs by 6.7 [deg.], the first clutch arm 319 and the second clutch arm start to revolve, and that position is indicated at a point (q) in FIG. 24.

Furthermore, since the revolution range of the second clutch arm, which is 9 [deg.], from the point (q) at which the first and second clutch arms start to revolve to a point (v) of the release of the gear engagement due to the second clutch arm is within the differential range of the first clutch arm 319, in the meantime the revolution angle of the first clutch arm 319 is 2.2 [deg.], and that position is a point (r) in FIG. 24.

Still further, the revolution angle θ2 of the second clutch arm is set to θ2=28 [deg.] as well as the first embodiment (see FIG. 16), and similarly it is within the differential range of the first clutch arm 319, and therefore its revolution angle is 13.5 [deg.] and that position is a point (s) in FIG. 24.

In FIG. 24, the switching margin of the first clutch arm 319 is between the point (r) of the engagement release due to the second clutch arm and the point (u) of the engagement start between the fourth W gear 314 and the fifth W gear 315. Thus, it is possible to ensure the switching margin of approximately 30 [deg.].

As described above, according to the third embodiment the differential internal tooth member 330 being the differential reduction mechanism (the differential reduction section) is disposed within the revolution range of the first clutch arm 319 organizing the first planetary clutch mechanism for establishing and cutting off the transfer of the driving force of the winding drive system, whereupon the revolution angle of the first clutch arm 319 can be set to a smaller value. Thus, the occupied space for the first clutch mechanism is reducible within the camera, which can contribute to the size reduction of the camera itself and which can sufficiently secure the switching margin for the respective drive systems at the rewrite to permit the certain switching operation.

Moreover, since the differential internal tooth member 330 is placed within the revolution locus of the fourth W gear 314, in the case that the camera is in the rewinding condition, even if the first clutch arm 319 is rotated due to external vibration, impact or the like while the first clutch arm 319 stands within the rewinding drive system, the first clutch arm 319 comes into contact with the differential internal tooth member 330 when rotating by the angle θ4, with the result that its rotation undergoes the restriction. Accordingly, in the state where the drive system of the camera is not in operation, it is possible to prevent the accident that the first clutch arm 319 is shifted to the fifth W gear 315 on the winding drive system side so that the fourth W gear 314 and the fifth W gear 315 engage with each other.

Although in the third embodiment the description has been made with reference to FIG. 24 only in the case of the backlash=0.07, even if setting, for example, the backlash=0.13 taking into consideration the difference among the backlashes, a sufficient switching margin is similarly attainable.

Although the differential internal tooth member 330 working as the differential reduction mechanism (the differential reduction section) is constructed such that only one tooth is the internal tooth (having the configuration corresponding to the internal gear of the number Z of teeth=47), this differential reduction mechanism is not limited to this construction, but it is also appropriate that it is a claw-like small projection or the like as long as it can block the rotational movements of the respective gears constituting the gear trains of the drive systems, and also in this case the same effects are obtainable.

Moreover, the differential internal tooth member 330 is not limited to one-tooth structure, but it is also possible that it has a plurality of internal teeth, and also in this case, the same effects are obtainable.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A camera having a winding drive system and a rewinding drive system which transfer power of a single electric motor, said camera comprising:
    a first planetary clutch mechanism for releasing power transfer within said winding drive system by rotation of said motor in a first direction and further for establishing power transfer within said winding drive system by rotation of said motor in a second direction;
    a second planetary clutch mechanism for releasing power transfer within said rewinding drive system by the rotation of said motor in said second direction and further for achieving power transfer within said rewinding drive system by the rotation of said motor in said first direction; and
    a reduction mechanism for accomplishing a differential reduction of a planetary gear of said first planetary clutch mechanism upon revolution of said planetary gear.

2. A camera having a winding drive system and a rewinding drive system which transfer power of a single electric motor, said camera comprising:
    a first planetary clutch mechanism located within said winding drive system and equipped with a first planetary gear which completes its own revolution when said motor drives a first rotating quantity;
    a second planetary clutch mechanism located within said rewinding drive system and equipped with a second planetary gear which completes its own revolution when said motor drives a second rotating quantity; and
    a reduction mechanism for accomplishing a differential reduction of said first planetary gear while said first planetary gear is revolving,
    wherein said first rotating quantity is set to be larger than said second rotating quantity.

3. A camera comprising:
    first and second driven members driven by a power of an electric motor;
    a first clutch mechanism for releasing transfer of a driving force to said first driven member by rotation of said motor in a first direction and further for achieving transfer of said driving force to said first driven member by rotation of said motor in a second direction;
    a second clutch mechanism for releasing transfer of a driving force to said second driven member by rotation of said motor in said second direction and further for achieving transfer of said driving force to said second driven member by rotation of said motor in said first direction; and
    a reduction mechanism for carrying out a differential reduction of a gear provided in said first clutch mechanism when said first clutch mechanism takes a differential action.

4. A camera as defined in claim 3, wherein said first driven member is a film winding member while said second driven member is a film rewinding member.

5. A camera as defined in claim 3, wherein each of said first and second clutch mechanisms is composed of a planetary clutch mechanism.

6. A camera as defined in claim 5, wherein said reduction mechanism conducts a differential reduction of a planetary gear of said planetary clutch mechanism composing said first clutch mechanism upon revolution of said planetary gear.

7. A camera as defined in claim 6, wherein said reduction mechanism is provided in a middle of a revolution locus of a planetary gear of said first planetary clutch mechanism and is provided with an engagement member which engages said planetary gear.

8. A camera as defined in claim 5, wherein a first rotating quantity of said motor taken until a planetary gear of said first clutch mechanism completes its own revolution is set to be larger than a second rotating quantity of said motor taken until a planetary gear of said second clutch mechanism completes its own revolution.

9. A camera comprising:
    an electric motor;
    a spool shaft serving as a take-up shaft for winding a film from a film cartridge mounted in the camera;
    a first planetary clutch mechanism for performing transfer switching between a transferring state where a driving force of said motor is transferred to said take-up shaft so that said take-up shaft is driven to rotate and a non-transferring state of releasing transfer of said driving force of said motor to said take-up shaft;
    a rewinding member connected to a cartridge shaft of the mounted film cartridge for rotationally driving said cartridge shaft to rewind said film wound around said take-up shaft into said film cartridge;
    a second clutch mechanism for performing transfer switching between a transferring state where a driving force of said motor is transferred to said rewinding member so that said rewinding member is driven to rotate and a non-transferring state of releasing transfer of said driving force of said motor to said rewinding member;
    drive control means for conducting a film winding drive operation to wind said film around said take-up shaft in a manner of switching said first planetary clutch mechanism to said transferring state and said second planetary clutch mechanism to said non-transferring state when said motor is driven in a forward direction and further for performing a film rewinding drive operation to rewind said film into said film cartridge in a manner of switching said second planetary clutch mechanism to said transferring state and said first planetary clutch mechanism to said non-transferring state when said motor is driven in a reverse direction; and means for, when switching to said film winding drive operation by the rotation of said motor in the forward direction after said film rewinding drive operation by the rotation of said motor in the reverse direction, setting a switching timing of said transferring state and said non-transferring state of said first and second planetary clutch mechanisms so that said second planetary clutch mechanism switches form said transferring state to said non-transferring state before said first planetary clutch mechanism switches from said non-transferring state to said transferring state.

10. A camera as defined in claim 9, wherein said switching timing setting means sets a larger revolution quantity between said transferring state and said nontransferring state of a planetary gear of said first planetary clutch mechanism than that of said second planetary clutch mechanism.

11. A camera as defined in claim 9, wherein said switching timing setting means includes an engagement member which engages with a planetary gear of said first planetary clutch mechanism, said engagement member being provided intermediate opposing ends of a revolution locus of said planetary gear.

12. A camera as defined in claim 11, wherein said engagement member is an internal gear which engages with said planetary gear, whereupon said planetary gear revolves in an area where said planetary gear engages with said internal gear.

13. A loading device of a camera which uses a film cartridge accommodating a film with a magnetic recording section and loads said film the forwarding said film therefrom, comprising:

one drive source;

a rewinding mechanism for receiving a driving force from said drive source to rewind said film into said cartridge;

a winding mechanism for receiving a driving force from said drive source to wind said film from within said cartridge;

a first clutch mechanism for respectively establishing and cutting off engagement between said drive source and said winding mechanism in accordance with rotating directions of said drive source; and a second clutch mechanism for respectively establishing and cutting of f engagement between said drive source and said rewinding mechanism in accordance with the rotating directions of said drive source, said second clutch mechanism stopping transfer of said driving force of said drive source to said rewinding mechanism when said first clutch mechanism is in a state of transferring said driving force of said drive source to said winding mechanism while said first clutch mechanism stopping transfer said driving force of said drive source to said winding mechanism when said second clutch mechanism is in a state of transferring said driving force of said drive source to said rewinding mechanism, wherein said first clutch mechanism includes a delay member for delaying switching from a driving force non-transferring state of said first clutch mechanism to the driving force transferring state thereof when said second clutch mechanism switches from the driving force transferring state to a non-transferring state due to switching of the rotating direction of said drive source, and said first clutch mechanism completes switching to the transferring state after switching said second clutch mechanism to the non-transferring state.

14. A loading device as defined in claim 13, wherein said first clutch mechanism includes a planetary gear and makes said driving force switch to said winding mechanism by revolution of said planetary gear.

15. A loading device as defined in claim 14, wherein said delay member is provided on a revolution locus of said planetary gear and is composed of one or more teeth which engage with said planetary gear.

16. A loading device as defined in claim 13, wherein said second clutch mechanism includes a planetary gear and performs the transfer switching of said driving force to said rewinding mechanism by revolution of said planetary gear.

17. A camera comprising:

a first drive system for driving a film winding member by rotation of an electric motor in a first direction;

a second drive system for driving a film rewinding member by rotation of said motor in a second direction;

a first planetary clutch mechanism provided in said first drive system and made to revolve by a given quantity upon rotation of said motor in said second direction to release transfer of power to said film winding member and further made to revolve by a given quantity upon rotation of said motor in said first direction to establish transfer of power to said film winding member; and a second planetary clutch mechanism made to revolve by a given quantity upon rotation of said motor in said first direction to release transfer of power to said film rewinding member and further made to revolve by a given quantity upon rotation of said motor in said second direction to establish transfer of power to said film rewinding member;

wherein a first rotating quantity of said motor necessary for completion of revolution of said first planetary clutch mechanism is set to be larger than a second rotating quantity of said motor necessary for completion of revolution by said given quantity of said second planetary clutch mechanism.

18. A camera made to perform winding and rewinding of a film through the use of a single electric motor at every film frame, comprising:

a first planetary clutch mechanism disposed in a winding drive system and made to establish and cut off transfer of a driving force by revolving by a given quantity between a position at which transfer of the driving force is established and a position at which transfer of the driving force is cut off;

a second planetary clutch mechanism disposed in a rewinding drive system and made to establish and cut off transfer of a driving force by revolving by a given quantity between a position at which transfer of the driving force is established and a position at which transfer of the driving force is cut off;

wherein said first and second clutch mechanisms are arranged so that a first rotating quantity of said motor necessary for the revolution of said first planetary clutch mechanism by the given quantity is set to be larger than a second rotating quantity of said motor necessary for the revolution of said second planetary clutch mechanism by the given quantity.

* * * * *

UNITED STATES PATENT AND TRADEMARK OFFICE
CERTIFICATE OF CORRECTION

PATENT NO. : 5,854,952
DATED : December 29, 1998
INVENTOR(S) : Terada

It is certified that error appears in the above-identified patent and that said Letters Patent is hereby corrected as shown below:

Col. 17, line 43, delete "lover" and insert --cover--.

Col. 18, line 12, delete "feedback" and insert --feedbacked--.

Col. 24, line 47, after "train" delete "rewinding drive" and insert --constituting the--.

Col. 31, line 38, delete "the" insert --by--.

Col. 31, line 52, delete "OF F" and insert --OFF--.

Signed and Sealed this

Twentieth Day of March, 2001

Attest:

NICHOLAS P. GODICI

*Attesting Officer*   *Acting Director of the United States Patent and Trademark Office*